United States Patent
Kuehn

(10) Patent No.: US 9,013,067 B2
(45) Date of Patent: Apr. 21, 2015

(54) METHOD AND APPARATUS FOR AUTOMATIC NETWORK STABILIZATION IN ELECTRIC POWER SUPPLY SYSTEMS USING AT LEAST ONE CONVERTER

(76) Inventor: Walter Kuehn, Laudenbach (DE)

( * ) Notice: Subject to any disclaimer, the term of this patent is extended or adjusted under 35 U.S.C. 154(b) by 730 days.

(21) Appl. No.: 13/269,734

(22) Filed: Oct. 10, 2011

(65) Prior Publication Data

US 2012/0112713 A1 May 10, 2012

Related U.S. Application Data

(63) Continuation of application No. PCT/EP2010/055076, filed on Apr. 16, 2010.

(30) Foreign Application Priority Data

Apr. 16, 2009 (DE) .......................... 10 2009 017 116
Sep. 24, 2009 (DE) .......................... 10 2009 042 865

(51) Int. Cl.
 *H02J 3/24* (2006.01)
 *H02J 3/36* (2006.01)
(52) U.S. Cl.
 CPC ... *H02J 3/24* (2013.01); *H02J 3/36* (2013.01); *Y02E 60/60* (2013.01)
(58) Field of Classification Search
 USPC ........................................................ 307/102
 See application file for complete search history.

(56) References Cited

U.S. PATENT DOCUMENTS

| 3,829,756 A | 8/1974 | Hockstetter |
| 6,219,591 B1 | 4/2001 | Vu et al. |
| 6,249,719 B1 | 6/2001 | Vu et al. |
| 7,656,140 B2 * | 2/2010 | Marino et al. ................ 323/282 |
| 2003/0011348 A1 | 1/2003 | Lof et al. |
| 2009/0001940 A1 * | 1/2009 | Sihler et al. ..................... 322/58 |

FOREIGN PATENT DOCUMENTS

| EP | 1723482 | 4/2008 |
| EP | 2009760 | 12/2008 |
| WO | 2009016113 | 2/2009 |

OTHER PUBLICATIONS

International Search Report with Written Opinion of the ISA for corresponding International Application No. PCT/EP2010/055076 with mail date of Aug. 16, 2010.
Wen, et al., "Dynamic Model and Predictive Current Control of Voltage Source Converter Based HVDC", International Conference on Power System Technology, Oct. 1, 2006, pp. 1-5.

* cited by examiner

*Primary Examiner* — Jared Fureman
*Assistant Examiner* — Duc M Pham
(74) *Attorney, Agent, or Firm* — Myers Wolin, LLC

(57) ABSTRACT

Method and apparatus for automatic stabilization of an electric power supply network system comprising a network and at least one converter adapted to exchange maximum transferrable power with the network by changing the real current through a stabilizing controller, whereby the necessary direction of current change is determined through real-time stability analysis.

14 Claims, 23 Drawing Sheets

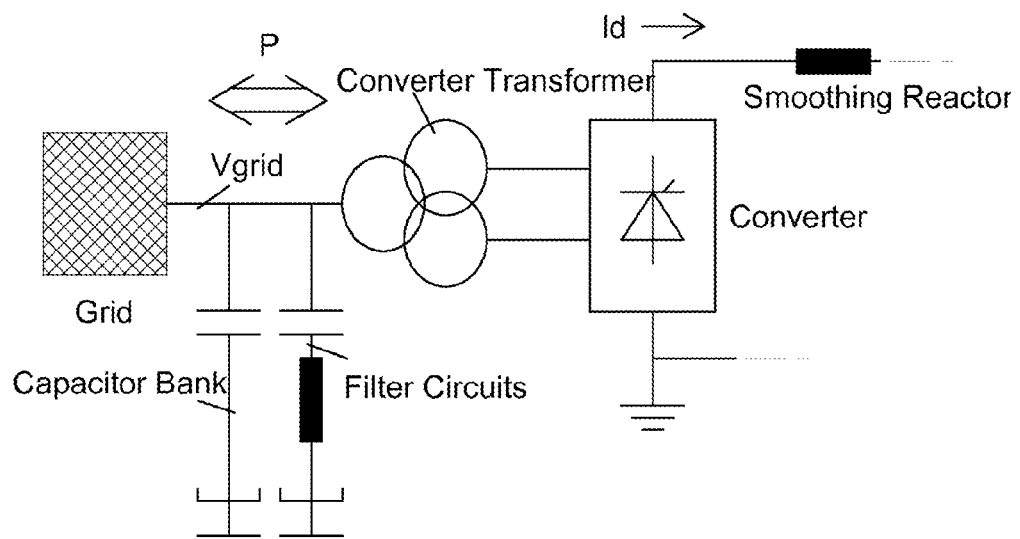
Fig. 1-a
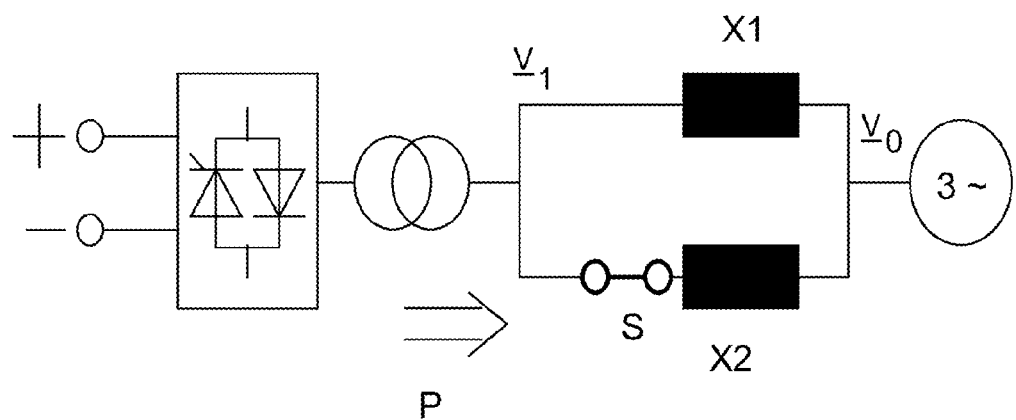
Fig. 1-b

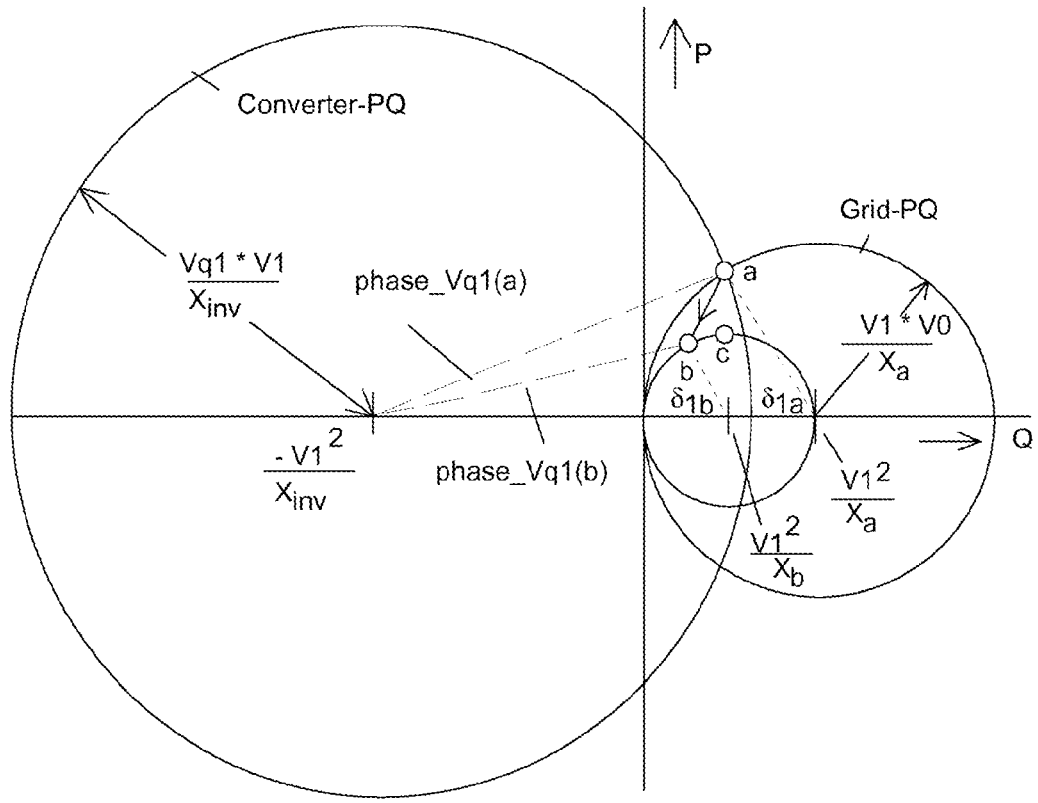
*Fig. 1-c*
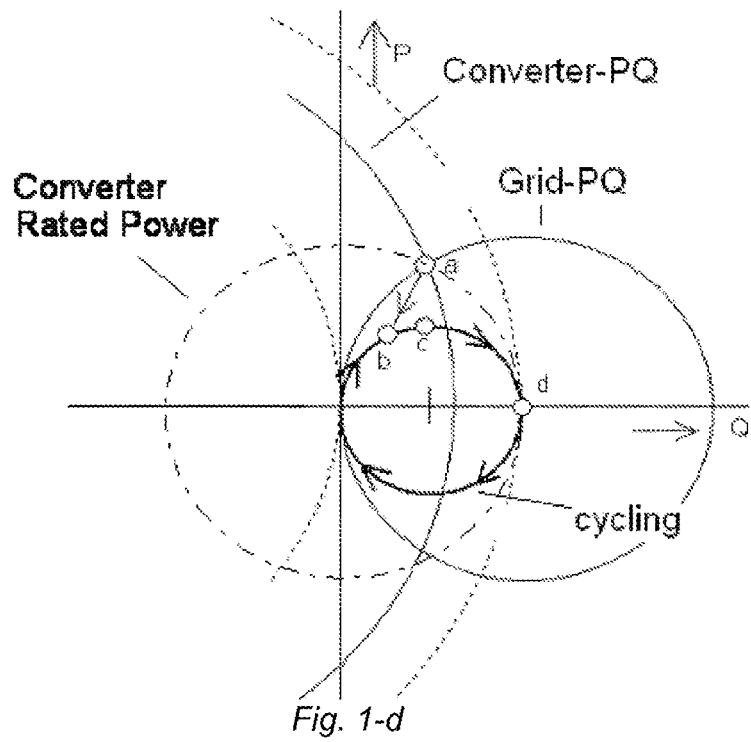
*Fig. 1-d*

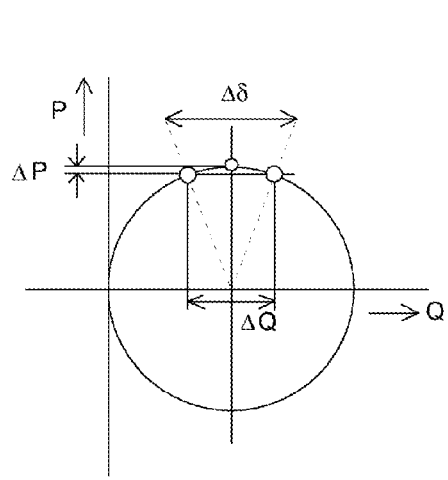
Fig. 1-e
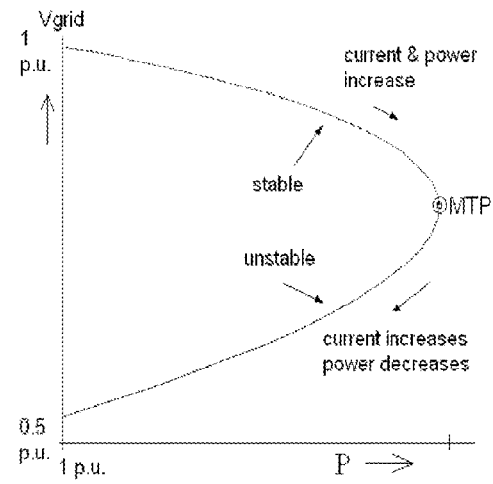
Fig. 1-f
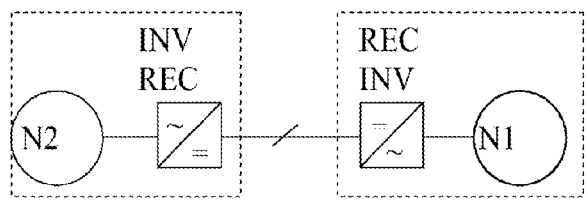
Fig. 2-a
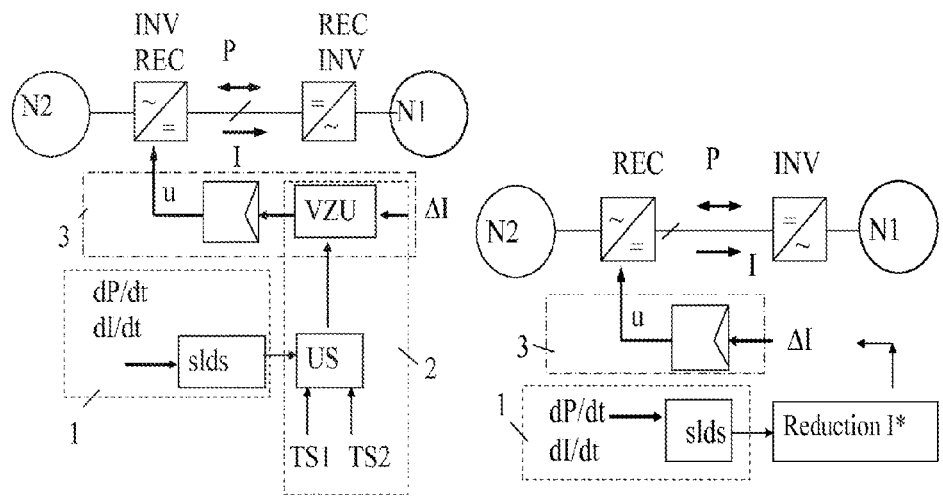
Fig. 2-b          Fig. 2-c

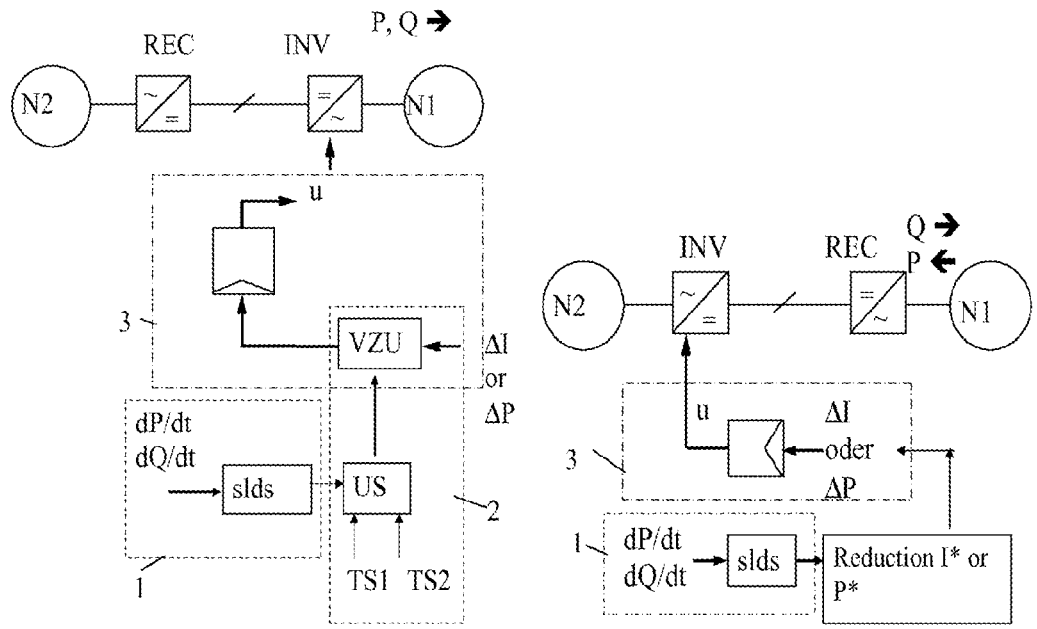
Fig. 2-d          Fig. 2-e
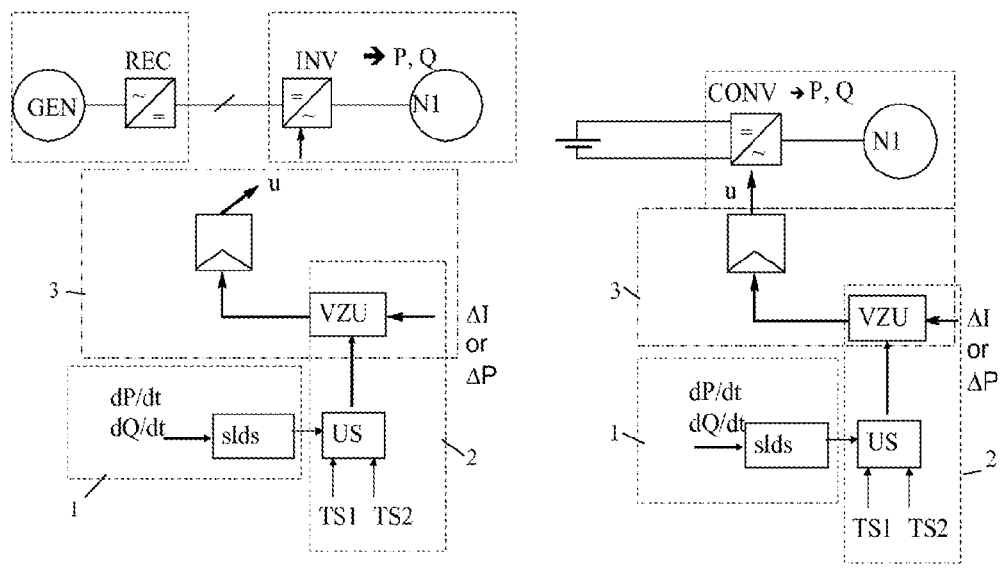
Fig. 2-f          Fig. 2-g

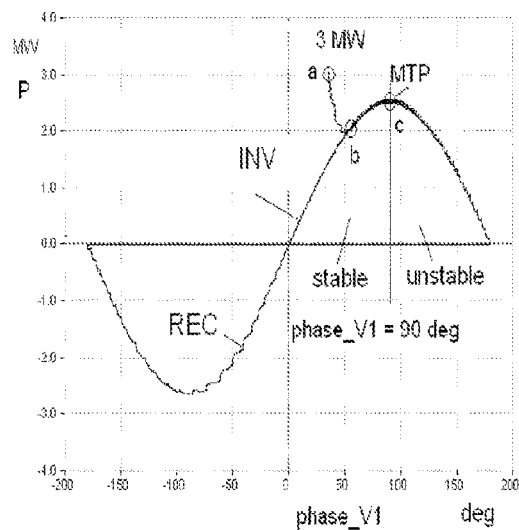
*Fig. 3-a*
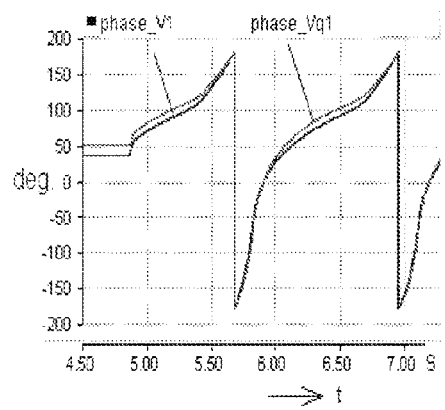
*Fig. 3-b*
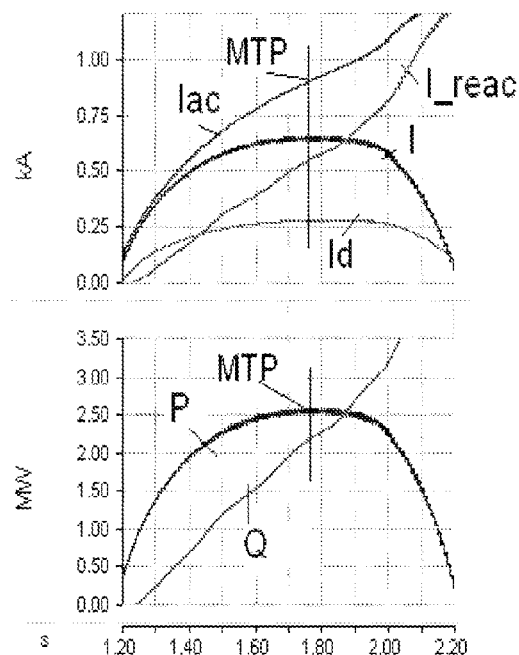
*Fig. 4-b*
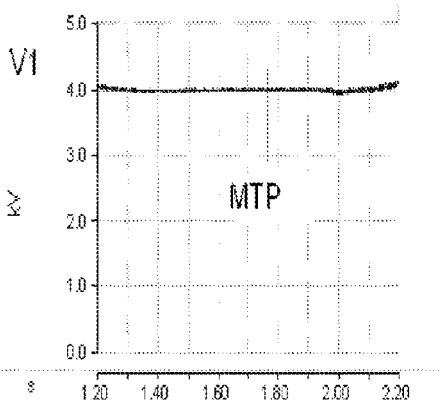
*Fig. 4-c*

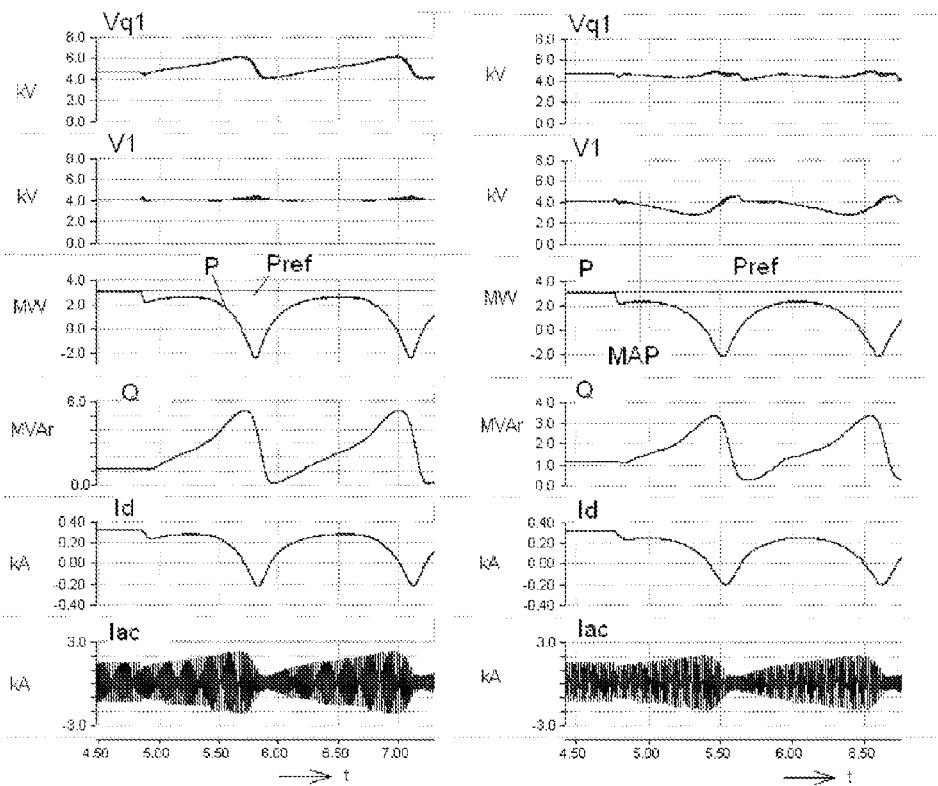
Fig. 4-a                    Fig. 6-a
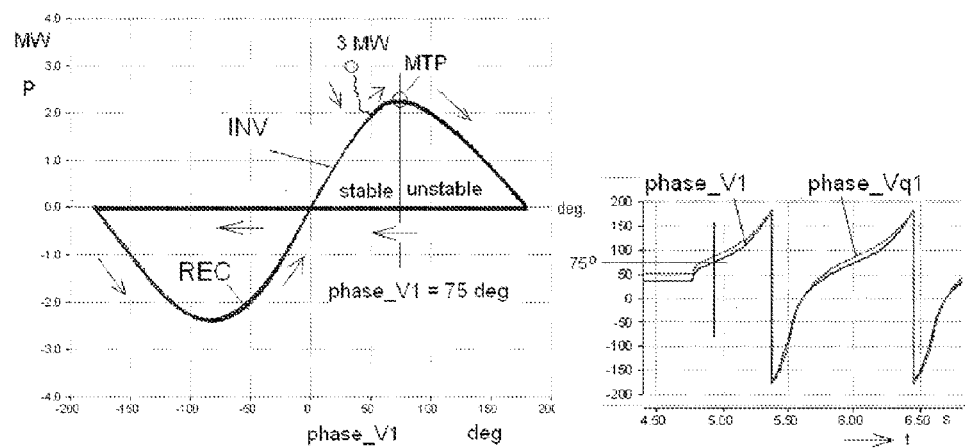
Fig. 5-a                    Fig. 5-b

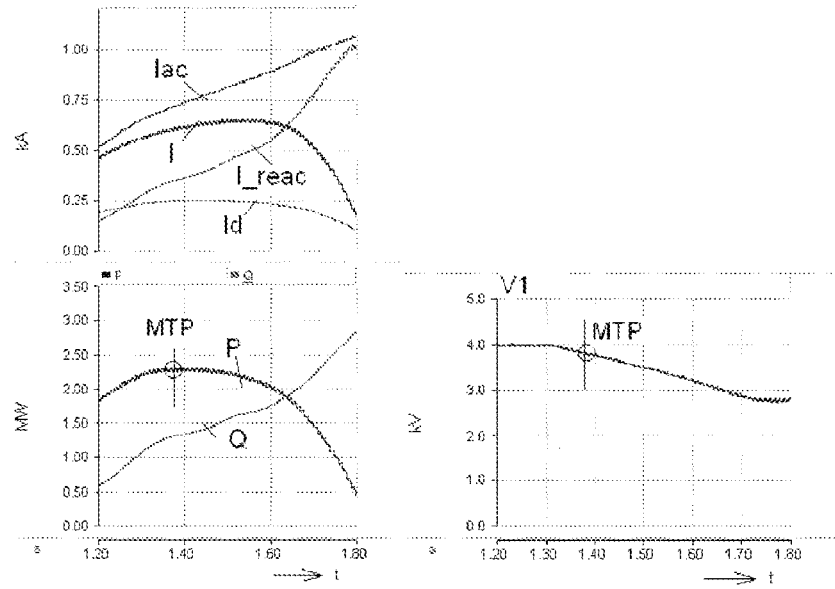
*Fig. 6-b*    *Fig. 6-c*
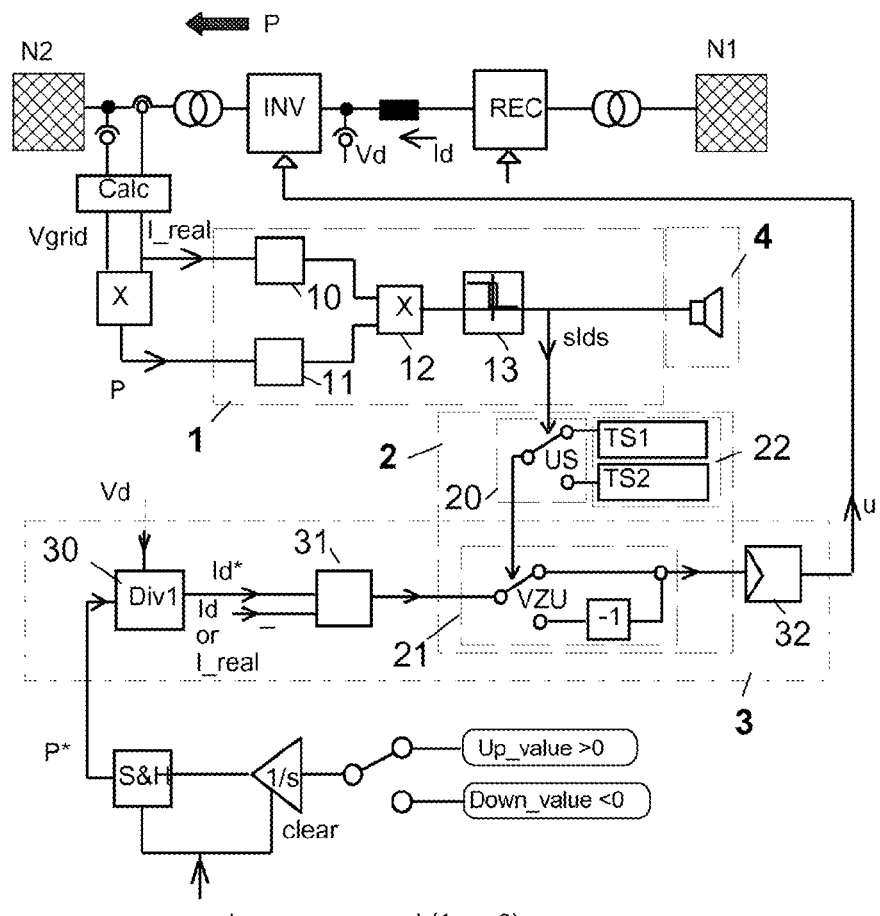
*Fig. 7*

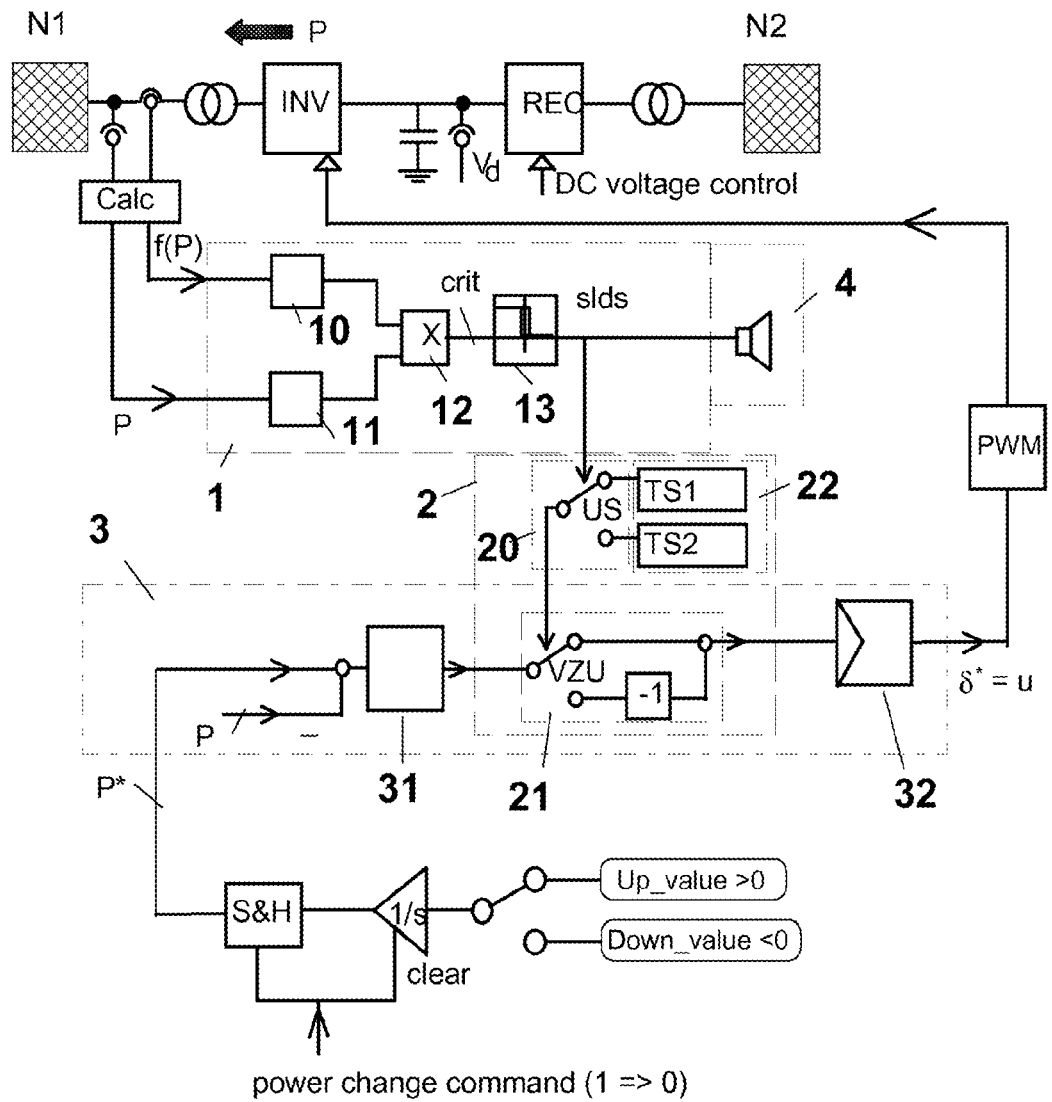
Fig. 10-a-1

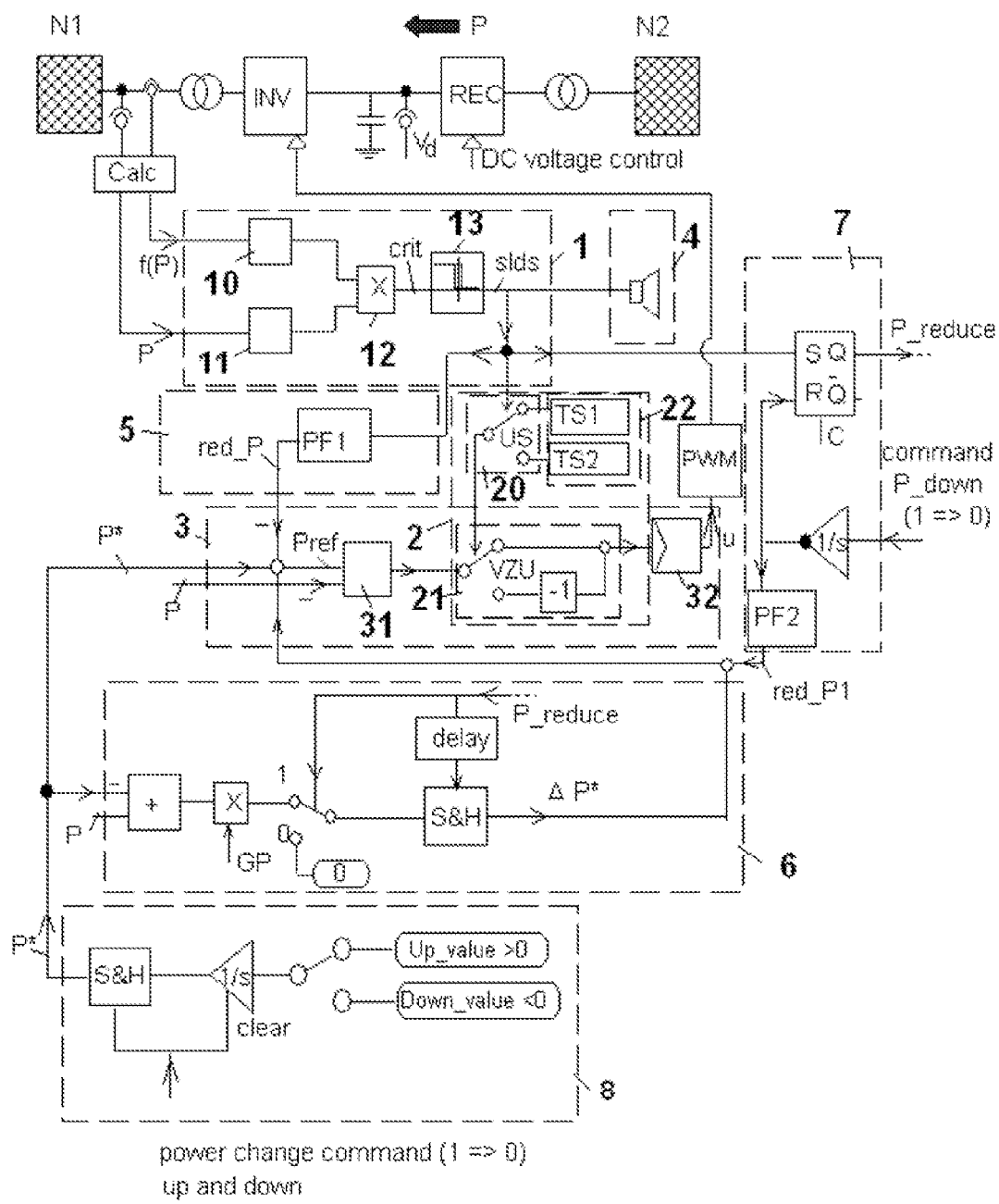
Fig. 10-a-2

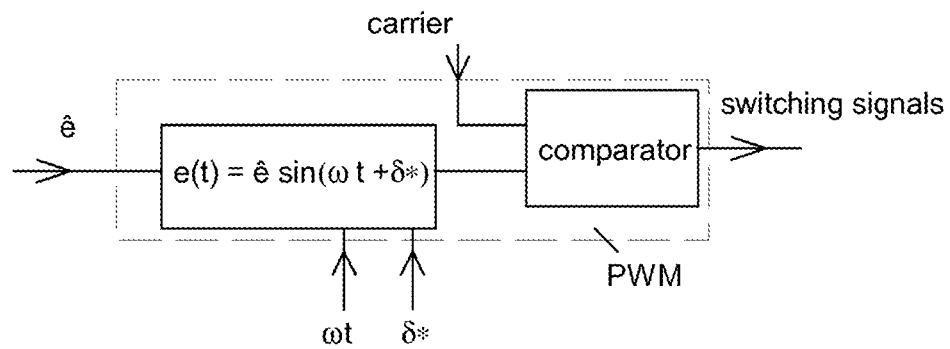
*Fig. 10-b*
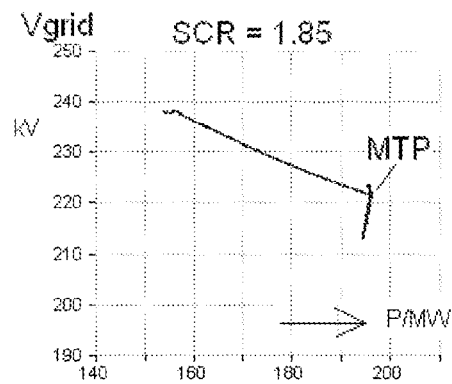
*Fig. 11-a*
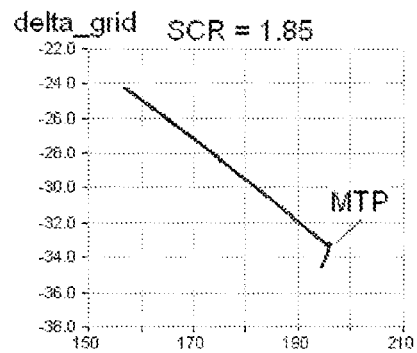
*Fig. 11-b*
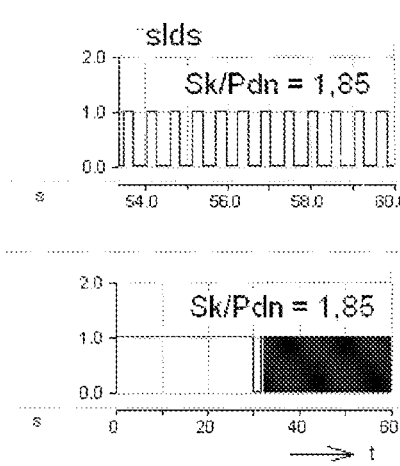
*Fig. 11-c*
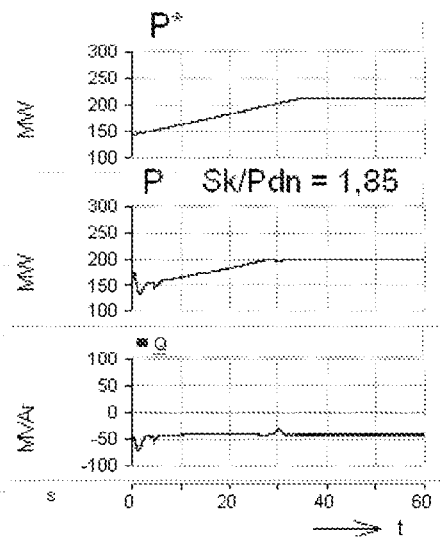
*Fig. 11-d*

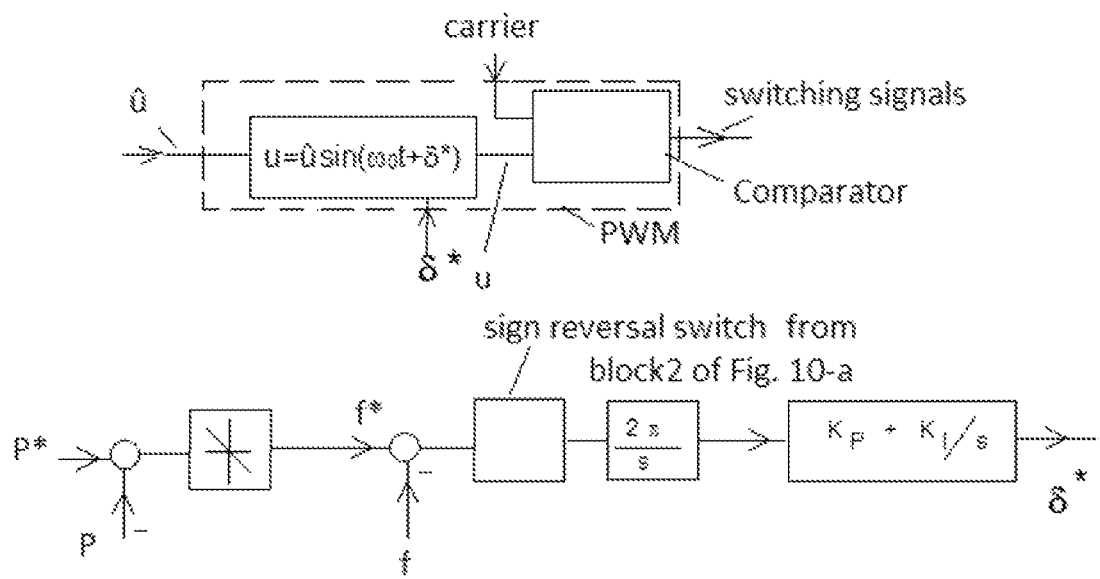
Fig. 10-c
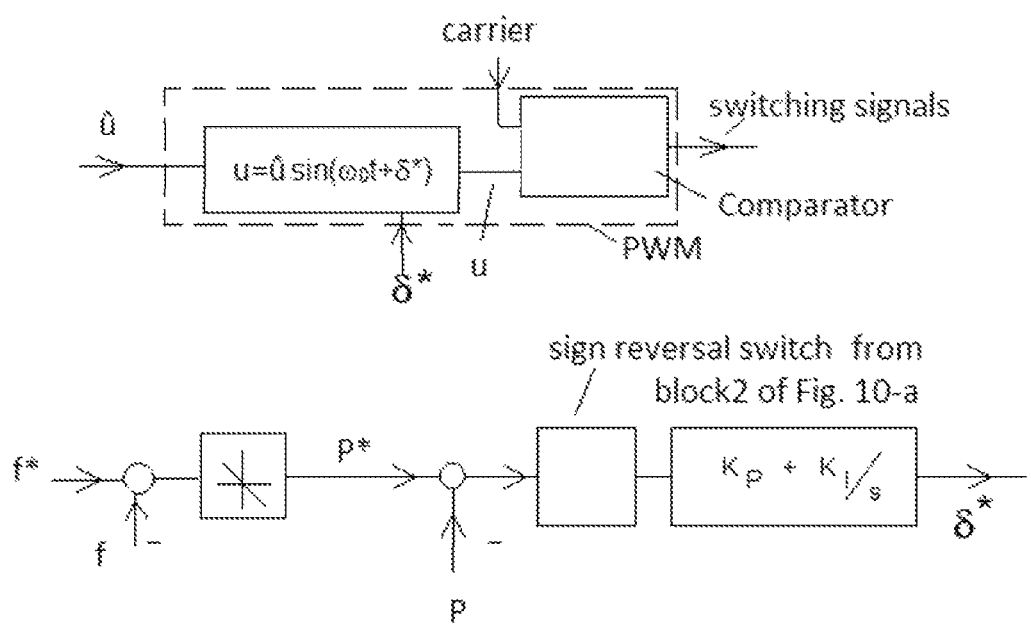
Fig. 10-d

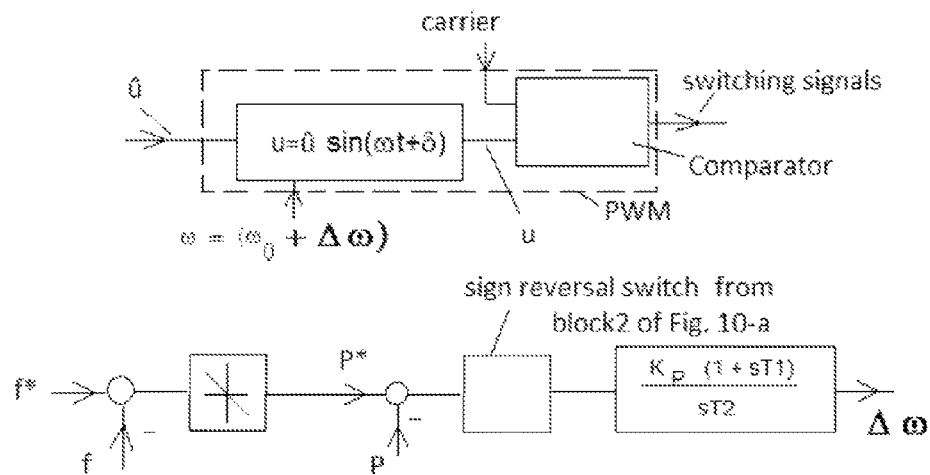
Fig. 10-e
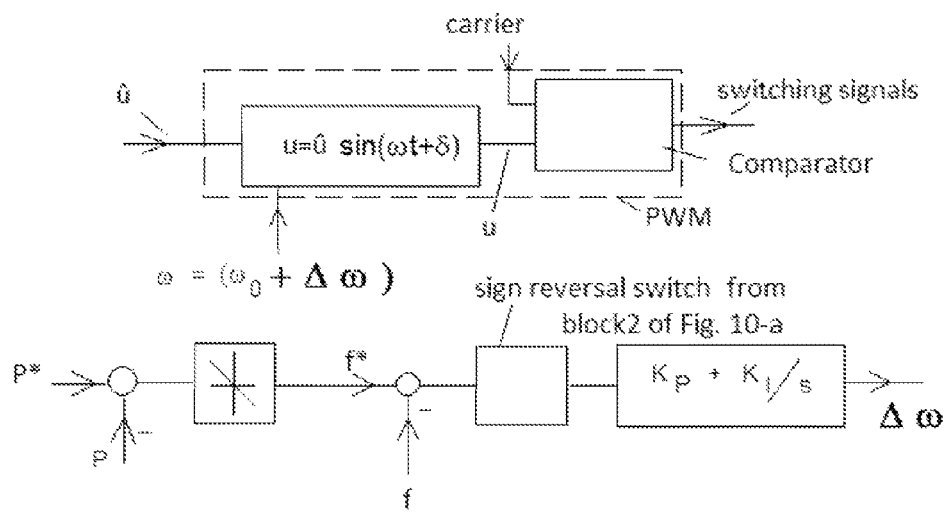
Fig. 10-f

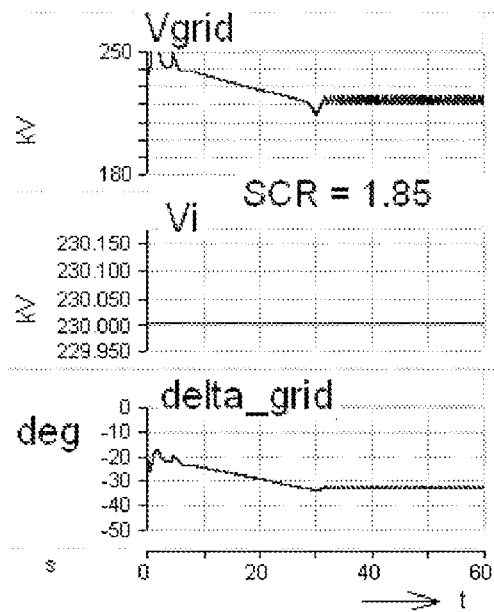
Fig. 11-e
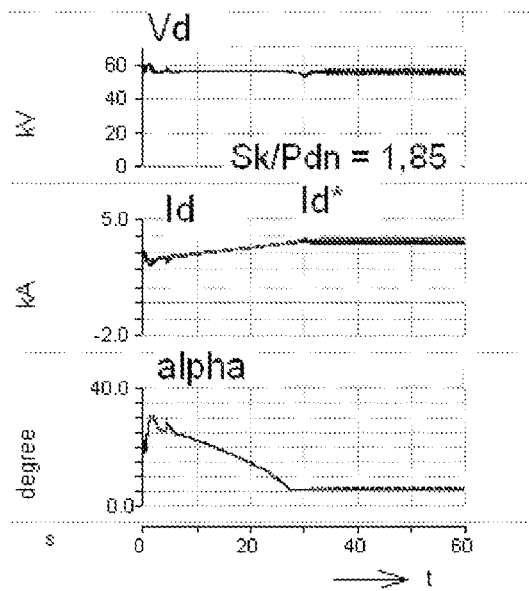
Fig. 11-f
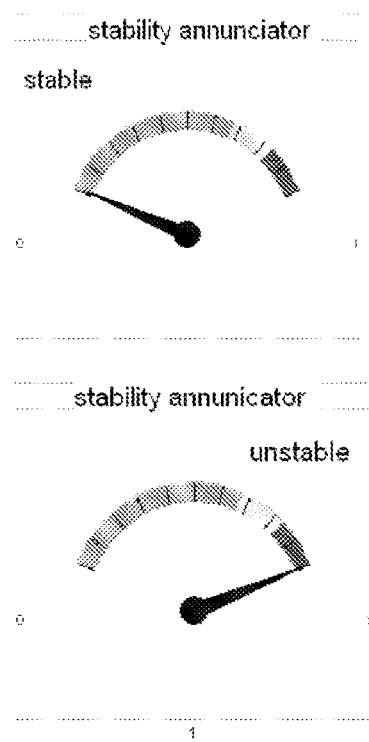
Fig. 11-7
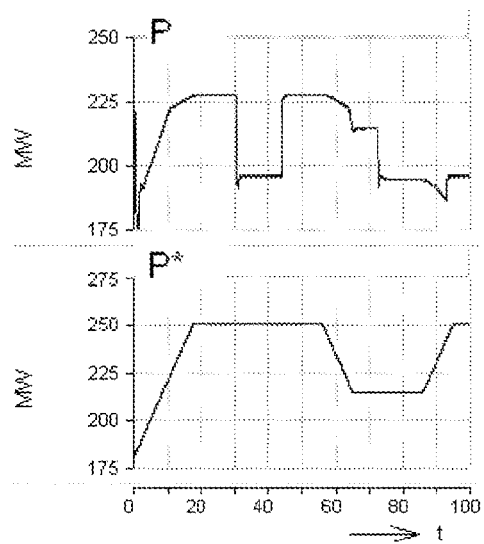
Fig. 11-8

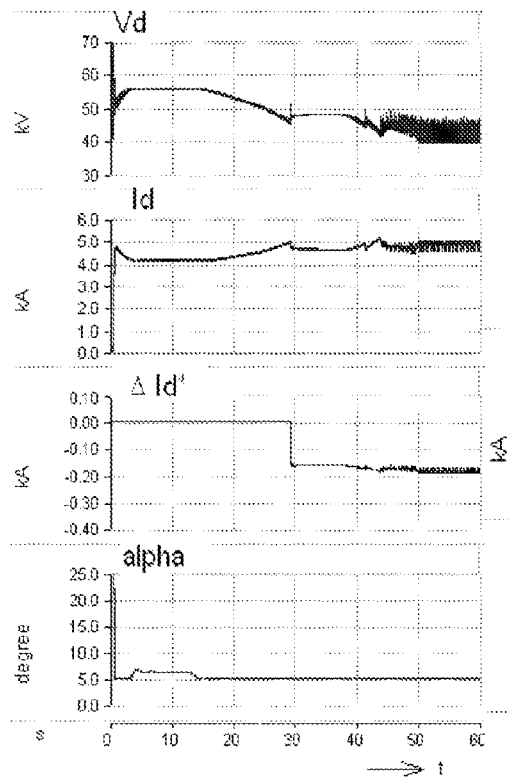
Fig. 12-5
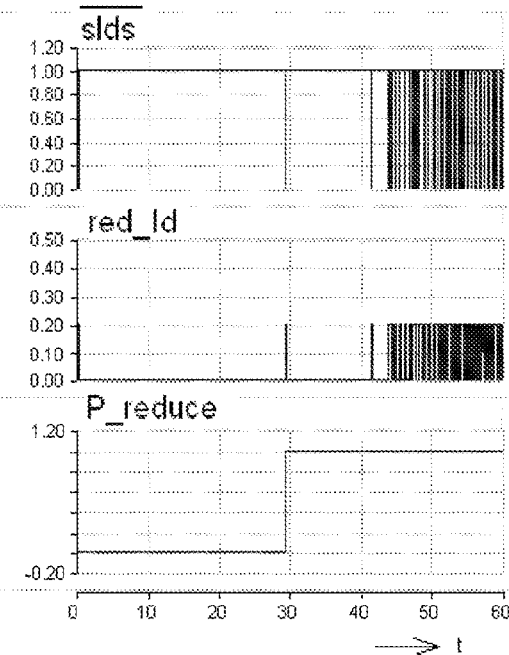
Fig. 12-6
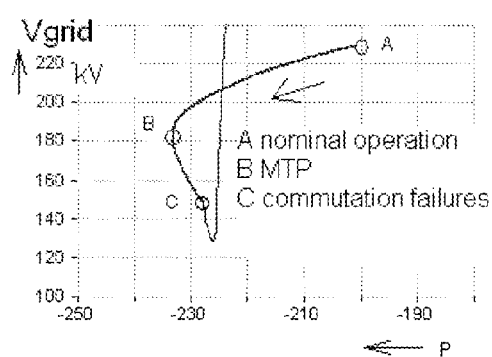
Fig. 13-a
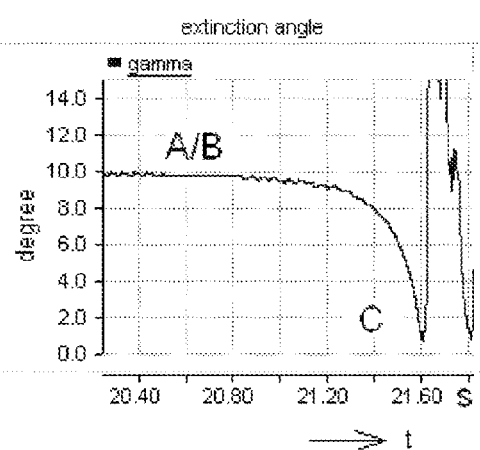
Fig. 13-b

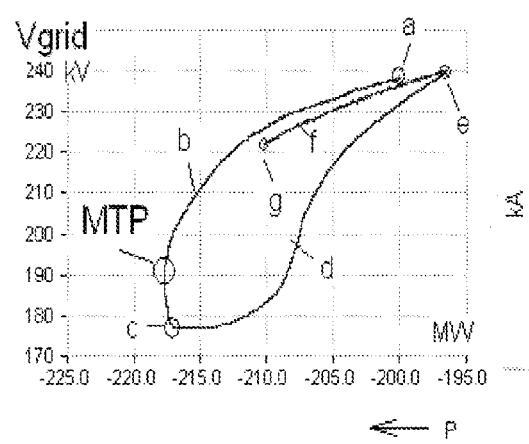
Fig. 13-c
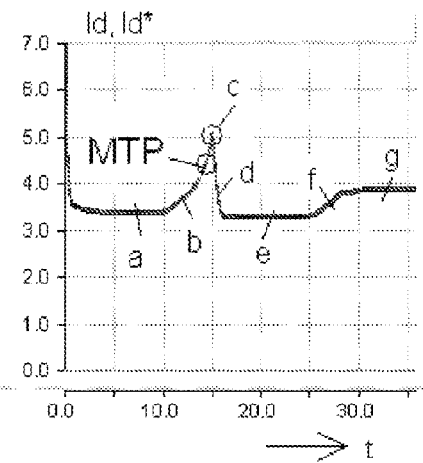
Fig. 13-d
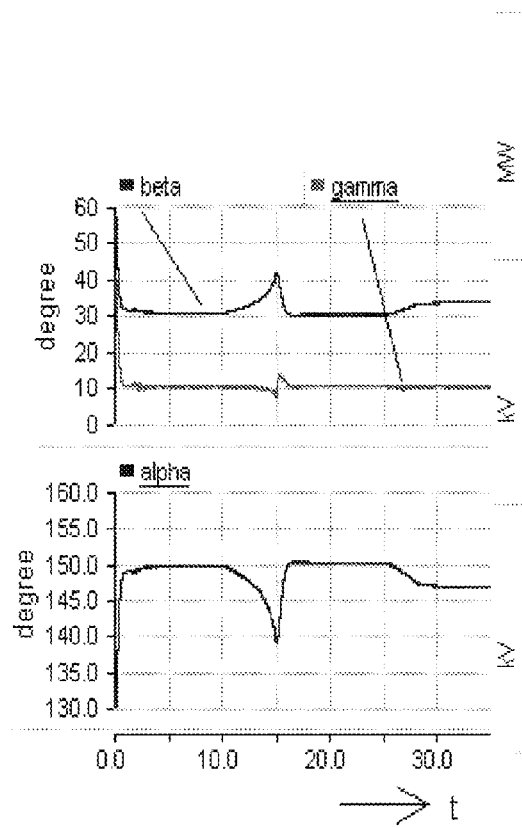
Fig. 13-e
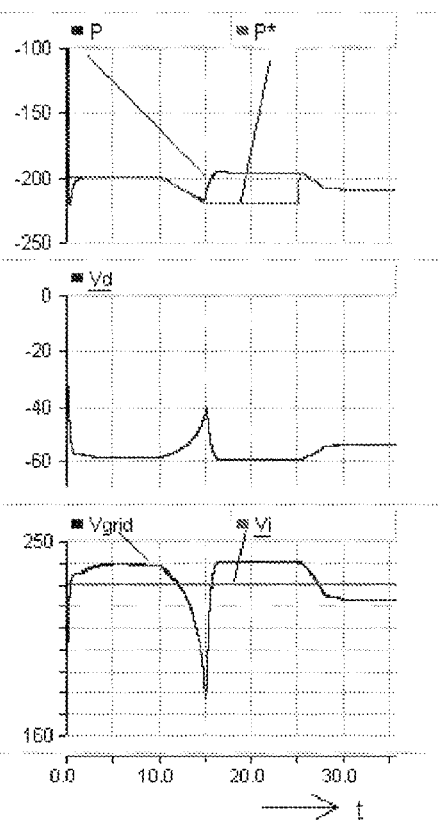
Fig. 13-f

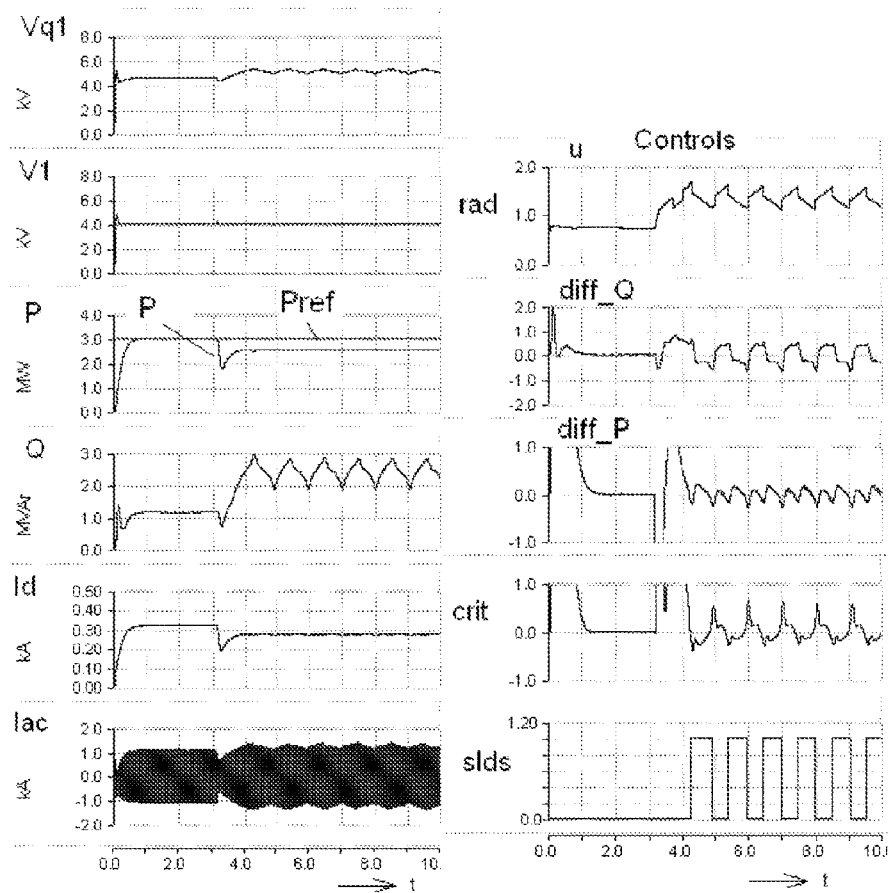
Fig. 14-a
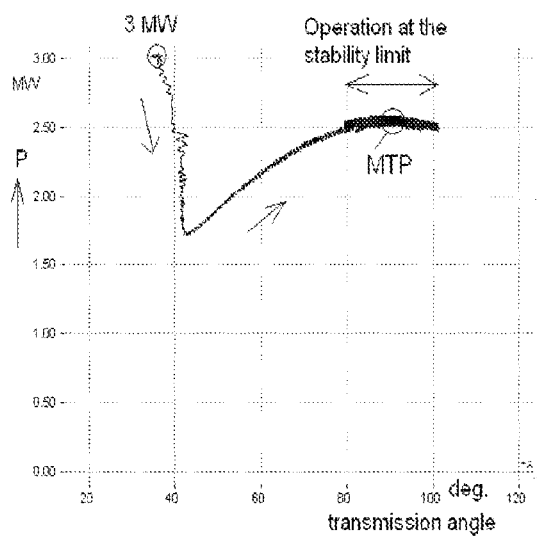
Fig. 14-b
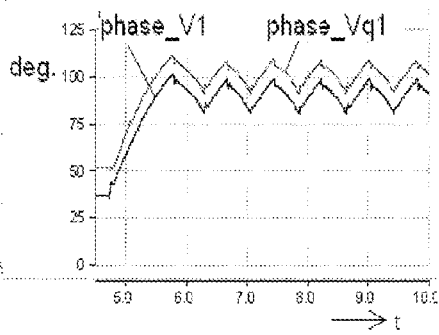
Fig. 14-c

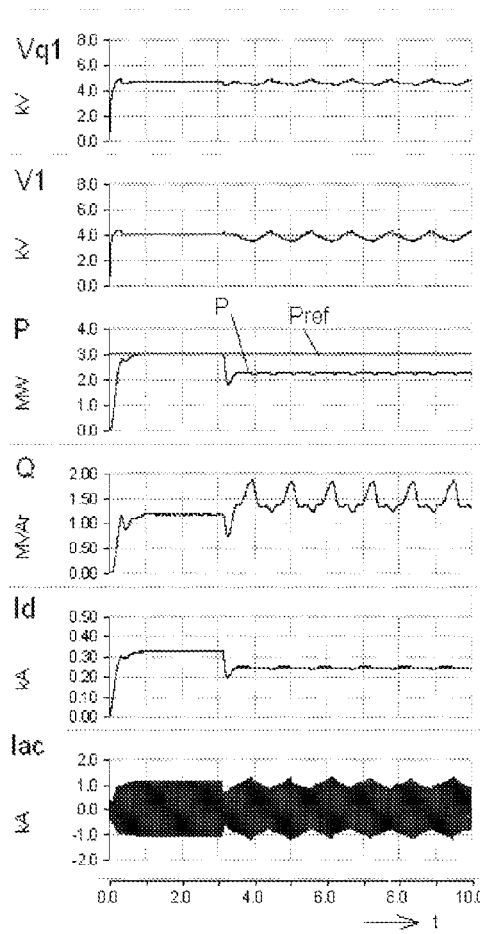
Fig. 15-a
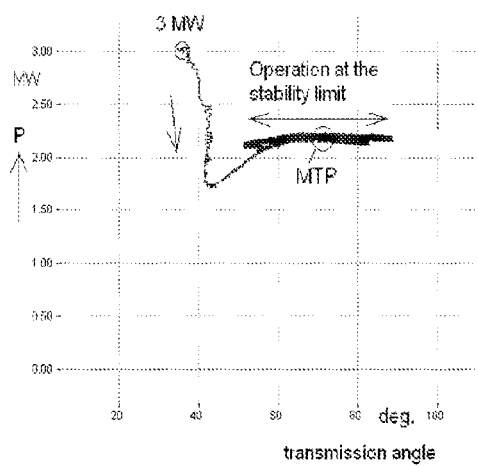
Fig. 15-b
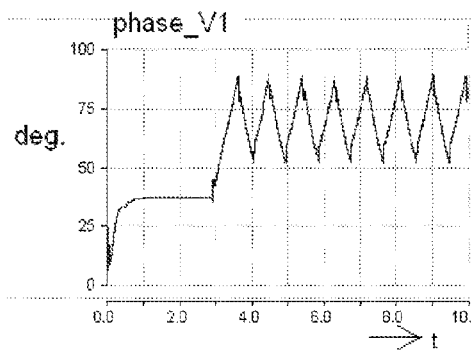
Fig. 15-c

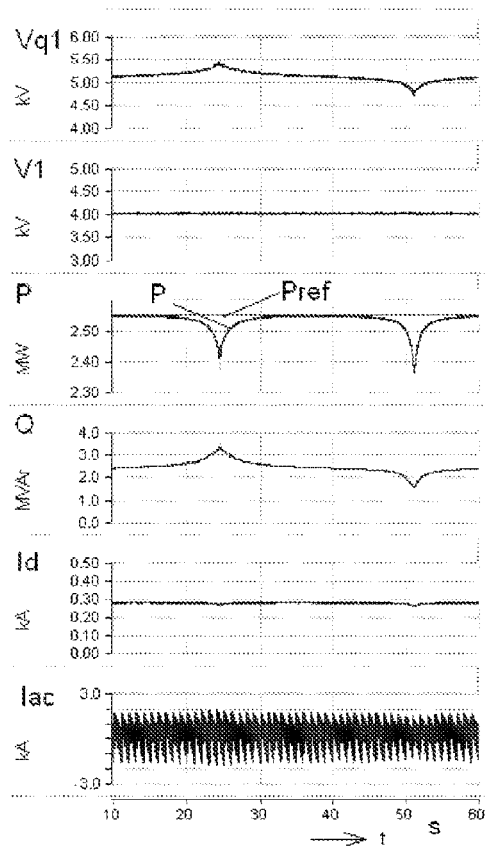
Fig. 16-a
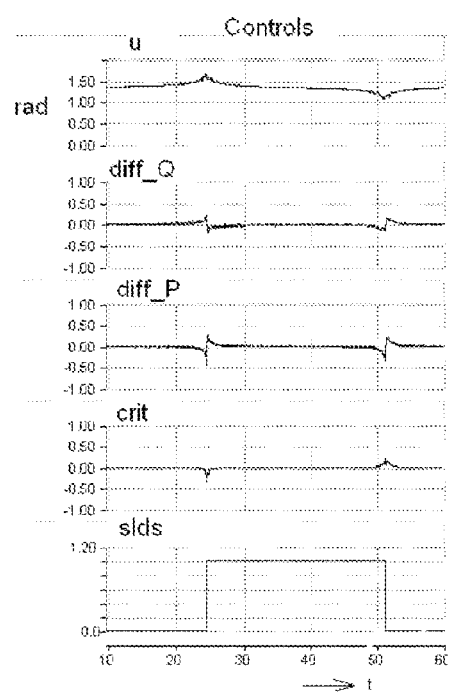
Fig. 16-b
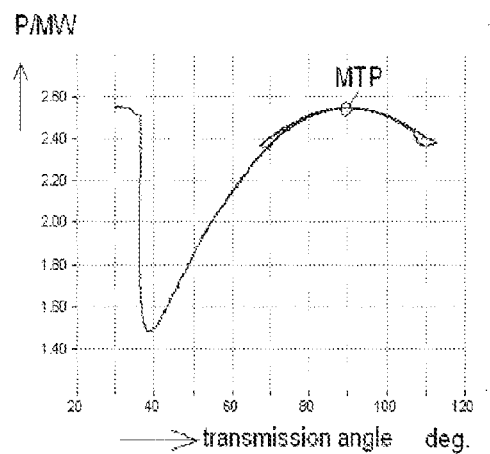
Fig. 16-c
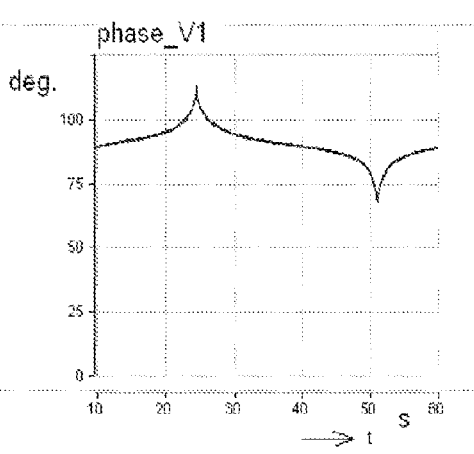
Fig. 16-d

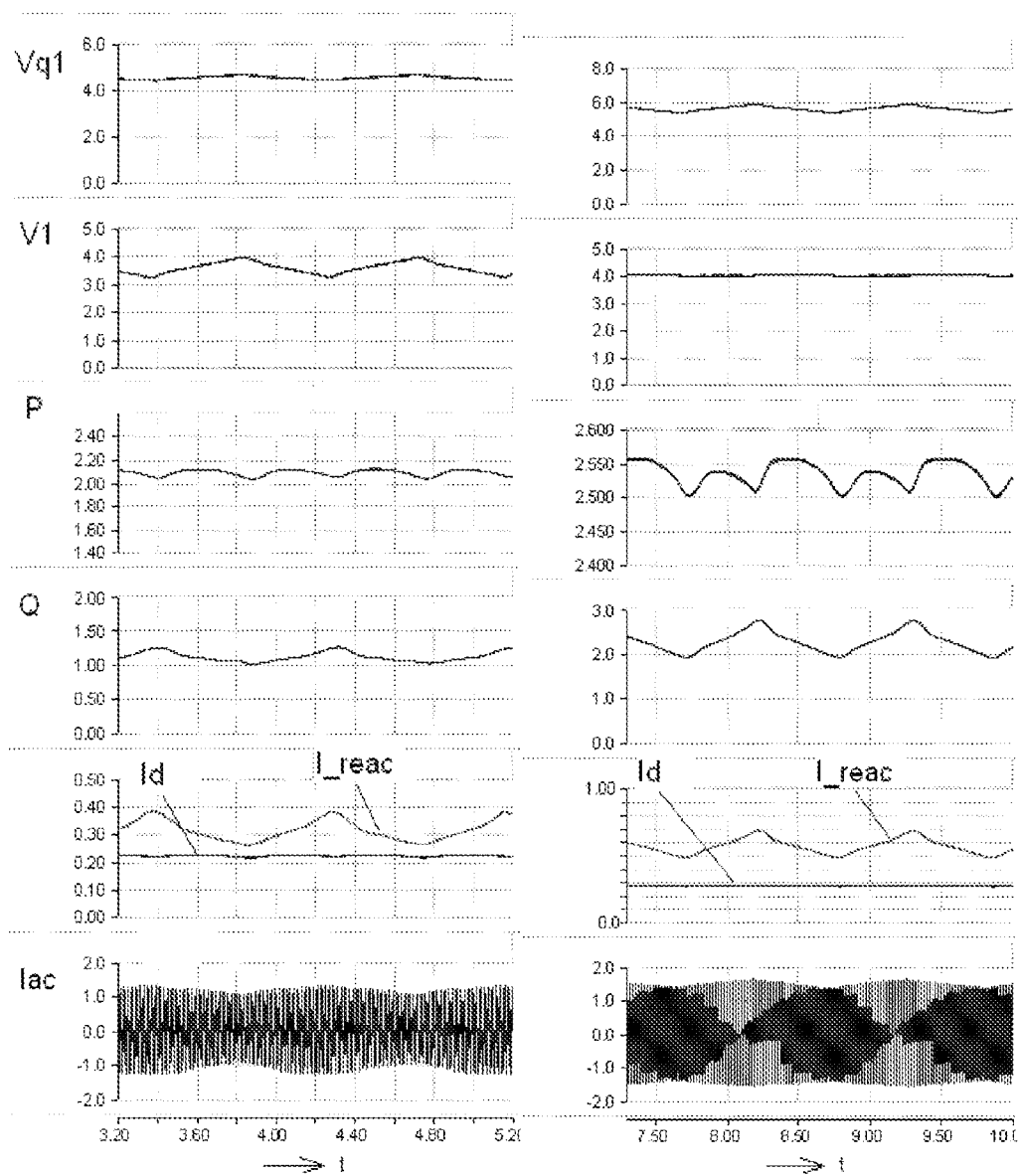
*Fig. 17-a*          *Fig. 17-b*

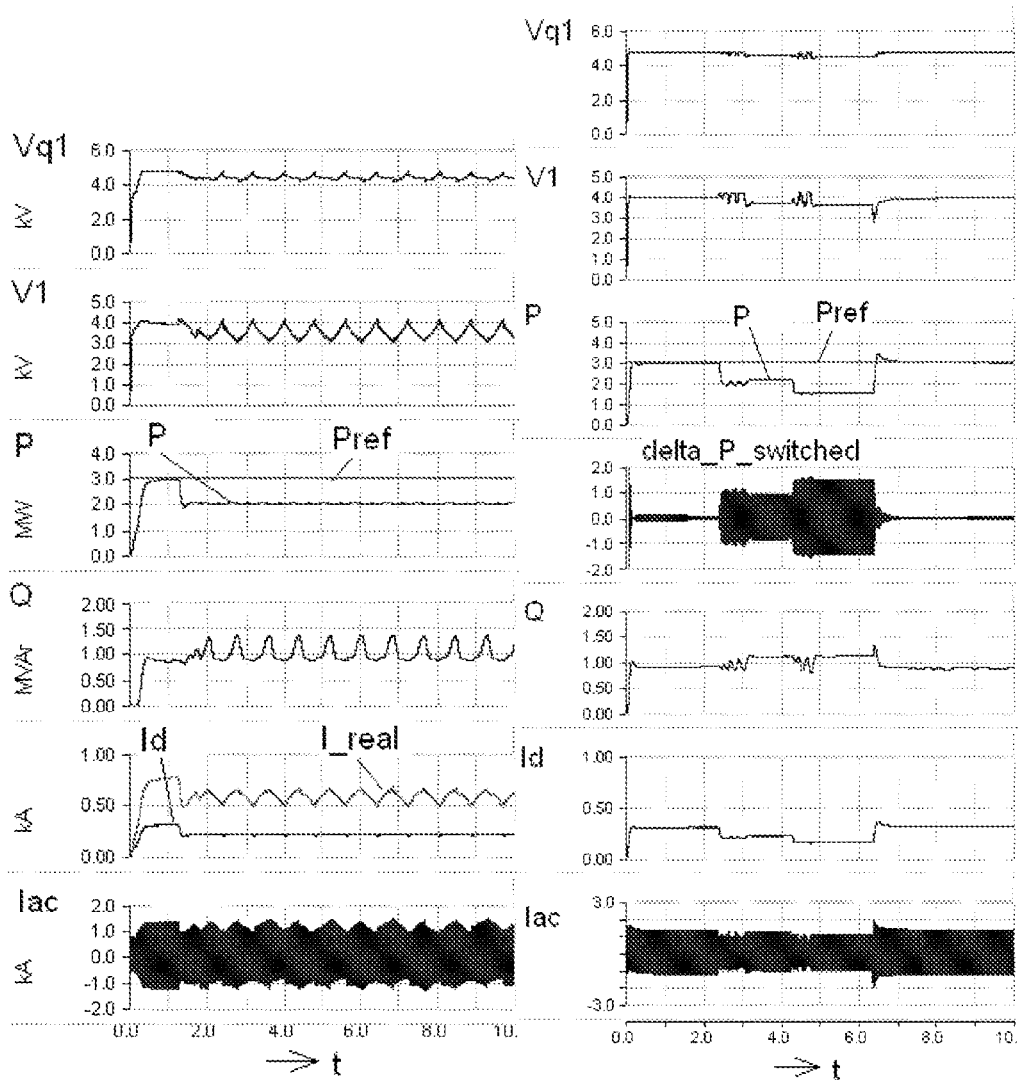
Fig. 17-c              Fig. 18

METHOD AND APPARATUS FOR AUTOMATIC NETWORK STABILIZATION IN ELECTRIC POWER SUPPLY SYSTEMS USING AT LEAST ONE CONVERTER

CROSS REFERENCE TO RELATED APPLICATIONS

This application is a continuation of International Application No. PCT/EP2010/055076, filed on Apr. 16, 2010, which claims priority to German Application No. 10 2009 017 116.9, filed on Apr. 16, 2009 and German Application No. 10 2009 042 865.8, filed on Sep. 24, 2009, the contents of each of which are incorporated herein by reference.

TECHNICAL FIELD

The present invention is directed to a method and apparatus for automatic network stabilization in electric power supply systems using at least one converter, and more particularly to prevention of voltage collapse and loss of synchronism.

BACKGROUND

Expansion of electric power grids with renewable energies will see an increased utilization of power converters for generation, transmission and energy storage. In order to keep the power system operable and highly reliable steady state voltage and transmission angle stability have to be ensured besides transient stability. These fundamental requirements are of particular concern in AC grids with weak converter connection points.

Weak AC grids are prone to voltage instability and subsequent voltage collapse if there is a reactive power unbalance. Voltage instability designates a power system state where the profile of node voltages cannot be kept above a certain desired voltage level. If further decline of AC voltage cannot be stopped voltage collapse is impending. Voltage collapse can occur, e.g., in connection with reactive power supply by capacitors, stalling asynchronous motors, over-excitation limitation of synchronous generators or if consumer load voltages are controlled via on-load transformer tap changers. The voltage collapse process is a dynamic process involving inherent or external closed-loop control characteristics.

Being relevant for the present invention voltage collapse is also known from current sourced line-commutated converters of High Voltage Direct Current (HVDC) transmission systems (FIG. 1-a) operating on weak AC grids. A didactic explanation of voltage stability associated phenomena at HVDC terminals is presented by Pilotto, Szechtman and Hammad in their paper on "Transient AC Voltage Related Phenomena for HVDC Schemes Connected to Weak AC Systems", appearing in IEEE Trans. on Power Delivery, Vol. 7, No. 3, pp. 1396-1404, 1992. This paper describes on page 1398 the importance of the voltage sensitivity factor to determine potential regions of voltage instability at an ac/dc junction. The "voltage sensitivity factor" method was first practically applied for the design of the Blackwater Back-to-Back Tie in Clovis, N. Mex., USA. See the paper by Kühn, Hammad, Güth, Neidhart: "Design and Control Strategies of HVDC Schemes for AC Voltage Control and Stabilization" presented at the Int. Conf. on DC Power Transmission in Montreal, June 1984, pp. 105-108 of the conference proceedings. Hammad's and Kuhn's paper "A Computation Algorithm for Assessing Voltage Stability at AC/DC Interconnections", IEEE Transactions on Power Systems, Vol. PWRS-1, No. 1, February 1986, provides an in-depth treatment.

Lee and Andersson summarize existing analytical methods and include own work on that subject—particularly on multi-infeed arrangements—in their paper "Voltage and Power Stability of HVDC Systems—Emerging Issues and New Analytical Methodologies", VII SEPOPE, Curitiba, Brazil, 23-28 May 2000. Practically relevant for controller design remain the a.m. "voltage sensitivity factor" and the related "voltage-power characteristic" both identifying the maximum transferrable power of the network for given network conditions. This information on critical network conditions is used during operation with the intention to circumvent unstable operating regions. This, however, cannot be guaranteed for the future where grid expansion changes the unstable operating regions.

A safe way to prevent voltage instability is the utilization of a static compensator as, e.g., the STATCOM. IEEE Special Publication "Voltage Sourced Converter (VSC) Applications in Power Transmission", no. 08TP200, refers to this device in sec. 3.1 as a "specific application for the compensation of DC transmission". The use of a STATCOM is only justifiable in weak AC grids. A DC link operating on a normally strong AC grid does not need and does not use a STATCOM. Then reduction of the short circuit power capacity through an unexpected fault or unplanned switching event may cause unstable conditions and voltage collapse if no countermeasures are taken. For line-commutated converters there exist presently two different countermeasures, one of which is described by Bunch and Kosterev in their paper "Design and Implementation of AC Voltage Dependent Current Order Limiter at Pacific HVDC Intertie", IEEE Transactions on Power Delivery, PE-408-PWRD-0-01-1999. Voltage Dependent Current Order Limitation (VDCOL) was introduced into the PDCI (Pacific HVDC Intertie) controls to cope with new operating conditions due to environmental requirements (see chapter III of the paper). Main reason for the implementation of VDCOL was the Aug. 10, 1996 WSCC outage in the USA.

The second measure reduces spontaneously the power order at the occurrence of certain network conditions as described in the a.m. paper "Design and Control Strategies of HVDC Schemes for AC Voltage Control and Stabilization" on page 106, text below FIG. 1. Here for a Back-to-Back Tie the nominal power of 200 MW is reduced to 60 MW to cope with the reduced SCR-value at an AC line trip following a three phase short circuit. VDCOL is not always reliable since for very weak converter connection points the depression of AC voltage at the stability limit is not high enough to actuate VDCOL. The converter can then suddenly and without any early indication go from stable to unstable as depicted in FIG. 5-a of the inventor's paper "Control and Stability of Power Inverters Feeding Renewable Power to Weak AC Grids with No or Low Mechanical Inertia", IEEE Power Systems Conference and Exhibition, Seattle, USA, 15-18 Mar. 2009. The second measure—which can be called Event Actuated Power Order Reduction (EAPOR)—requires exact knowledge of the maximum transferable power levels for all possible system operating states including worst case contingencies. With ongoing installations of renewable generation facilities and corresponding changes of the load flow it will be difficult if not impossible to keep track of necessary modifications of the power reduction schedule.

After all it can be stated: presently implemented real-time controls do not reliably prevent voltage collapse when operating on a weak AC grid.

Besides the above treated classical line-commutated converters now self-commutated voltage sourced converters play an increasingly important role in HVDC power transmission. Contrary to classic HVDC transmission these converters permit continuous voltage control in addition to real power transfer. Power from off-shore wind farms will predominantly be transmitted via HVDC links using voltage sourced self-commutated converters. These converters are also preferably used for distributed generation of renewable energies (solar cell facilities, fuel cells, battery storage plants and frequency converters) on medium and low voltage level.

Since the voltage-sourced self-commutated converter will be equipped with defined voltage control capability voltage stability is usually not considered as a problem. Even when the internal converter voltage hits its ceiling the voltage is at least supported. Frequency stability as it is often addressed in connection with the substitution of rotating synchronous generators by self-commutated converters can actually be achieved through implementation of artificial rotating mass in converter controls as shown in the before mentioned paper.

Another type of instability relates to the transmission angle of the network the converter is connected to. For a radial system the transmission angle is the difference of the phase angles of the terminal voltages of a radial AC line. For a meshed network it refers to the difference between Thevenin's equivalent voltage and the terminal voltage. From the voltage magnitude no conclusion can be drawn regarding the transmission angle. The voltage control capability of the converter can even hide transmission angle instability. This can be considered as a major problem in future power grids if not adequately addressed and cured. Transmission angle instability can lead to loss of synchronism. The currently envisaged use of Voltage Phasor Measurements via the Global Positioning System (GPS) cannot be considered as remedial measure in connection with converters since a state estimator including converters, converter based transmission systems and controls, particularly control limits, is not available at the time being. The following describes the mechanism leading to transmission angle instability.

In general it is assumed that voltage sourced self-commutated converters can easily cope with weak system conditions. Actually they do not need at all an active AC grid and they can provide continuous voltage control. However, a digital computer study conducted for the present invention showed that also self-commutated converters can cause instability in connection with weak AC grids. The study holds for a simple generic but nevertheless representative equivalent circuit (FIG. 1-$b$). Diagrams showing the dependency between real power (P) and reactive power (Q) (FIGS. 1-$c$ and 1-$d$) as well as time line diagrams of converter and AC grid quantities reveal possible stability problems: FIG. 3-$a$, 3-$b$, 4-$a$, 4-$b$ and 4-$c$ hold for unlimited reactive power supply capability and FIG. 5-$a$, 5-$b$, 6-$a$, 6-$b$ and 6-$c$ for limited reactive power supply capability of the self-commutated converter.

The PQ-diagrams (FIGS. 1-$c$ and 1-$d$) given here hold for equal magnitudes of the internal (V0) and terminal (V1) AC voltages (FIG. 1-$b$). For different voltages (V0, V1) the diagram shifts along the Q-axis and the circle diameter changes in proportion to the product of the voltages. The circle will be transposed horizontally when there is a parallel capacitance at the AC converter terminal (either, e.g., stemming from a compensating condenser or from an AC line). This shift on the Q-axis has to be considered for the stability analysis described further below.

Operating point "a" in FIGS. 1-$c$ and 1-$d$ holds for a closed switch (S) (FIG. 1-$b$). Operating point "b" holds for an open switch (S). The power angle of the inverter ($\delta_{inv,a}$, $\delta_{inv,b}$) and the power transmission angle ($\delta_{1a}$, $\delta_{1b}$) of the AC grid adopt values in accordance with the power transfer level and the values of the coupling reactance $X_{inv}$ ($X_{inv,a}$, $X_{inv,b}$) and the grid reactance ($X_a$, $X_b$). Since for the present simulations the phase angle of the equivalent internal AC voltage is chosen as zero, the power transmission angle $\delta_1$ has the same value as the phase angle phase_V1 of the AC terminal voltage.

When the switch (S) is opened the power (P) reduces immediately down to the value at operating point "b" which is lower than the maximum transferable power (MTP) of the AC-grid. The MTP-level can be calculated from $$P=(V1 \times V0 \times \sin \delta_{1b})/X_b$$

The converter power controller detects the power control error and responds by increasing the phase angle (phase_Vq1) of the internal converter voltage (Vq1) to compensate for this error. However, the real power supplied by the inverter can not become larger than the MTP-level. Because the controller does not know the value of the MTP-level it will increase the DC current beyond the MTP-point and actually decrease the real power. If not stopped through protective measures the operating point will cycle through inverter and rectifier operation (FIG. 1-$d$).

FIGS. 3-$a$ and 5-$a$ show this cycling via the depiction of power/angle-trajectories. FIG. 3-$a$ holds for inverter controlled AC voltage without reactive power supply limitation. FIG. 5-$a$ holds for limited reactive power supply capability. FIGS. 3-$b$ and 5-$b$ show the corresponding phase angles of the AC terminal voltage (phase_V1) and the converter internal voltage (phase_Vq1). Their difference is the converter's power angle.

The changing radius of the converter PQ-Diagram (FIG. 1-$d$) reflects the change of the reactive power supply requirement when the operating point moves from "a" to "b" and then through the bold solid circle clockwise from "b" via "c" to "d" and then back to "b". For the situation depicted in FIG. 1-$d$ the rated converter power (line-dotted circle going through "a" and "d") is not exceeded. That is, the inverter controls the AC voltage magnitude (V1) (FIG. 4-$c$) also within the unstable region of the transmission angle (phase_V1) (FIG. 3-$a$). If the unstable operating point "d" of the grid PQ-diagram (FIG. 1-$d$) would lie outside rated converter power the AC voltage would decrease, however, it does not collapse (FIG. 6-$c$). The AC voltage magnitude is, therefore, no proper criterion to predict an impending instability.

After opening the switch (S) (FIG. 1-$b$) transmission angle instability occurs in both the cases, for fully controllable AC terminal voltage as well as for limited control. For full voltage control the stability limit lies at 90° (FIG. 3-$a$), limited voltage control yields an angle of 75° (FIG. 5-$a$).

Wide-system outages in all parts of the world occurring during the last decades have enforced research work in the power system community to understand better the voltage collapse phenomena and to find methods and tools to solve the problem. Considering the immense consequences of outages for economy and daily life these investigations are necessary and urgent, particularly in light of the planned power generation additions using large amounts of wind power and in contrast to this, the inadequacy of the actual power grids. Loss of revenues can sum up to millions of dollars for such systems as the WSCC grid if outages last several hours.

Fundamental contributions are Cutsem's paper on "Voltage Instability: Phenomena, Countermeasures, and Analysis Methods", Proceedings of the IEEE, Vol. 88, No. 2, February 2000, p. 208-227, and the IEEE Special Publication "Voltage Stability Assessment: Concepts, Practices and Tools", Product No. SP101PSS, August 2002. Both the publications deal with pure AC systems, except for a short hint on page 215 of Cutsem's paper on HVDC modulation—last section before chapter IV. Specifics of converter related problems are not covered although HVDC transmission systems have a very strong impact on grid stability as shown by Hammad in his paper on "Stability and Control of HVDC and AC Transmission in Parallel", IEEE Trans. on Power Delivery, Vol. 14, No. 4, pp. 1545-1554, October 1999. The coupling of the transmission angle of a parallel AC/DC transmission with the AC terminal voltage of the converters introduces even more complexity into the problem then a pure DC transmission does. Also here application of the voltage sensitivity factor is possible as mentioned on page 1550 of the paper.

Patents and patent application publications reviewed by the author relate to voltage stabilization in AC power systems with no particular features for interconnected AC/DC systems. The subsequent assessment of their meaning for converter equipped power systems shows that these patents as to the judgment of the author are not usable for an avoidance of voltage collapse in AC/DC systems.

European Patent EP 1 723 482 B1, Pub. Date: Apr. 9, 2008, relates to a special method for voltage stabilization when using a transformer. The proposed controls are meant to operate in case of dynamic instabilities. I.e., after a line and/or load impedance change the power grid is still statically capable of meeting the real power request. This does not cover static unbalance of power demand and transferable power which is the reason for steady state voltage instability and following dynamic voltage collapse.

U.S. Pat. No. 6,219,591 B1, Date of Patent: Apr. 17, 2001, and U.S. Pat. No. 6,249,719 B1, Date of Patent: Jun. 19, 2001, relate to a voltage instability predictor identifying in real time proximity to the stability limit and providing a signal which can be used, e.g., to impose a limit on loading or to shed load when the limit is exceeded, to block on-load tap changing (OLTC) transformers or to enhance static VAR systems which can mask an imminent voltage collapse. A certain margin between actual power and maximum transferable power should not be exceeded to reliably avoid instability. However, selection of the margin involves heuristics, i.e., the estimation of closeness to instability is not secure. Also it is doubtful whether the method can be applied for converters at all because of control limits becoming effective at certain operational conditions leaving no time for the necessary estimation process. And if it could be applied it would only provide load-shedding by reducing the power set value of the converter. This would not be a stabilization method with automatic adaption to maximum transferable power as it is desired for maximum efficiency.

United States Patent Application Publication US 2003/0011348 A1, Pub. Date: Jan. 16, 2003, discusses possible combinations of conventional and renewable generation facilities, including converters and a so called co-active controller. However, specific converter related methods and apparatus for automatic voltage and transmission angle stabilization are in no aspect addressed and clarified, particular the problem of voltage collapse, the underlying destabilizing phenomena and related concrete mitigating converter implemented methods and means are no subject in that material.

According to the current state of the art there is no secure method available detecting instability of the line-commutated or self-commutated converter and conducting an operation with maximum transferrable network power.

SUMMARY OF THE INVENTION

The object is to provide a method and apparatus which alleviate the electric power system from these deficiencies and problems, at least to some degree.

Contrary to the above described state-of-the-art methods of voltage dependent current order limiting and event actuated power order reduction the present invention detects reliably voltage and transmission angle instability and it protects against voltage collapse and loss of synchronism irrespective of whatever network changes will take place in the future. Furthermore the converter power adapts itself to maximum transferable network power thus providing maximum efficiency.

The present invention—in the following referred to as Voltage Collapse Preventer (VCP)—can be used in stand alone or to back-up existing but not reliably working methods and implementations. The VCP consists of a real time stability analyzer, a closed loop sign reverser and a closed loop stabilizing controller. Only local measurements are needed. The VCP works for small and slow as well as for fast and large changes impacting the short circuit power ratio of the network. It is a dynamic device.

The invention is applicable for line-commutated as well as for self-commutated converters. The invention can also be used for the sole purpose of voltage collapse prevention when there is no other need for a power converter.

The invention provides for a reliable and efficient power supply system using line-commutated and/or self-commutated converters by avoiding voltage and angle instability with an automatic adaption of the converter power to the maximum transferrable network power.

BRIEF DESCRIPTION OF THE DRAWINGS

The invention and preferred embodiments thereof are described in more detail below with reference to the drawings in which:

FIG. 1-*a* is single line diagram showing a line-commutated converter with a capacitor bank and filter circuits for reactive power compensation and harmonic filtering, FIG. 1-*b* is an arrangement for the investigation of transmission angle stability of a voltage sourced self-commutated converter operating on a weak AC grid, FIG. 1-*c* are superimposed PQ-diagrams of an AC grid and a voltage sourced self-commutated converter, FIG. 1-*d* is a PQ-plot showing cycling through the grid PQ-diagram when an AC line is tripped, FIG. 1-*e* is a PQ-plot of the AC grid which shows the changes of real power and reactive power for stabilized operation around the crest of the voltage/power curve of FIG. 1-*f*, FIG. 1-*f* is the voltage over real power characteristic (Vgrid=f(P)) at a weak AC connection point for uncontrolled voltage, FIG. 2-*a* is a basic configuration for bidirectional DC power transfer using line-commutated or self-commutated converters, FIG. 2-*b* is a block diagram for a DC power transmission using line-commutated converters including controls for stability analysis and stability control using sign reversal of the current control loop, FIG. 2-*c* is a block diagram like that in FIG. 2-*b*, but without sign reversal of the control loop, FIG. 2-*d* is a block diagram for a DC power transmission using self-commutated converters including controls for stability analysis and stability control using sign reversal of the current or power control loop, FIG. 2-*e* is a block diagram like that in FIG. 2-*d*, but without sign reversal of the control loop, FIG. 2-*f* is a block diagram for self-commutated converters for power feed-in by wind turbines or water power turbines including controls for stability analysis and stability control with sign reversal of the control loop, FIG. 2-g is the block diagram for a self-commutated converter when directly coupled to a DC source for generation and energy storage including controls for stability analysis and stability control with sign reversal of the control loop, FIG. 3-a is a plot of real power (P) over the transmission angle (phase_V1) for a self-commutated converter with controlled converter terminal voltage, FIG. 3-b is an oscillogram of the phase angle (phase_V1) of the converter terminal voltage and of the phase angle (phase_Vq1) of the internal converter voltage for controlled terminal voltage, FIG. 4-a is an oscillogram of voltages, powers and currents for controlled converter terminal voltage, FIG. 4-b is an oscillogram of quantities being relevant for stability analysis for controlled converter terminal voltage, FIG. 4-c is an oscillogram of the controlled converter terminal voltage, FIG. 5-a is a plot of real power (P) over the transmission angle (phase_V1) for a self-commutated converter with limited reactive power supply capability, FIG. 5-b is an oscillogram of the phase angle (phase_V1) of the converter terminal voltage and the phase angle (phase_Vq1) of the internal converter voltage for limited reactive power supply capability, FIG. 6-a is an oscillogram of voltages, powers and currents for limited reactive power supply capability, FIG. 6-b is an oscillogram of quantities being relevant for stability analysis with limited reactive power supply capability, FIG. 6-c is an oscillogram of the converter terminal voltage for limited reactive power supply capability, FIG. 7 is a block diagram for a DC transmission system with current-sourced line-commutated converters and the rectifier working on a weak grid (N1), including provisions for stability analysis and stabilizing control with operation at the stability limit, FIG. 11-7 is a display of the stability status FIG. 11-8 are oscillograms of the actual power (P) and the set value (P*) over time to demonstrate power limitation and adaption to the maximum transferable power when using a proportional controller for stabilizing control, FIG. 12-1 is a plot of the AC voltage (Vgrid) over real power (P) at a reduction of the internal grid voltage (Vi) using MTP dependent power order tracking, FIG. 12-2 is a plot of the transmission angle (delta_grid) over real power (P) for a reduction of the internal grid voltage using MTP dependent power order tracking, FIG. 12-3 are oscillograms of the set value (P*) and the actual value (P) of real power and of the reactive power exchange (Q) between converter and AC grid using MTP dependent power order tracking, FIG. 12-4 are oscillograms of AC voltage (Vgrid), internal AC grid voltage (Vi) and transmission angle (delta_grid) using MTP dependent power order tracking, FIG. 12-5 are oscillograms of DC voltage (Vd), DC current (Id) and firing angle (alpha) using MTP dependent power order tracking, FIG. 12-6 are oscillograms of the inverted stability limit detection signal (slds), the pulsed change of the current reference value (redid) and the hold signal (P_reduce) for automatic reduction of the power set value, FIG. 13-a is a plot of the AC grid voltage over real power covering the range from nominal operation over the maximum transferable power point to commutation failures and FIG. 13-b is the corresponding oscillogram of the inverter extinction angle at the occurrence of commutation failures, FIG. 13-c is a plot of AC voltage over real power, FIG. 13-d is a plot of the reference value and the actual value of the DC current, FIG. 13-e are oscillograms of various converter angles, FIG. 13-f are oscillograms of the actual and the set value of real power, of the DC voltage and of the terminal voltage as well as the equivalent internal voltage of the AC grid, FIG. 14-a are oscillograms of voltages, powers and currents as well as of control signals used in the stability analyzer and the stabilizing controller when operating a voltage sourced self-commutated inverter at the steady state stability limit with unlimited reactive power supply capability, FIG. 14-b is plot of real power (P) over the transmission angle (=phase angle (phase_V1)) for the conditions being valid in FIG. 14-a, FIG. 14-c are oscillograms of the phase angle (phase_V1) of the converter terminal voltage (V1) and of the phase angle (phase_Vq1) of the internal inverter voltage (Vq1) for the conditions being valid in FIG. 14-a, FIG. 15-a are oscillograms of voltages, powers and currents as well as of signals used for the stability analyzer and the stabilizing controller when operating a voltage sourced self-commutated inverter at the steady state stability limit with limited reactive power capability, FIG. 15-b is plot of real power (P) over the transmission angle (=phase angle (phase_V1)) of the converter terminal voltage for the conditions being valid in FIG. 15-a, FIG. 15-c is an oscillogram of the phase angle (phase_V1) of the converter terminal voltage for the conditions being valid in FIG. 15-a, FIG. 16-a are oscillograms of voltages, powers and currents demonstrating stability of a voltage sourced self-commutated inverter for small and slow changes, FIG. 16-b are oscillograms of control signals holding for the conditions being valid in connection with FIG. 16-a, FIG. 16-c is a plot of real inverter power over the transmission angle (=phase angle phase_V1), whereby the inverter is operated as in FIG. 16a, FIG. 16-d is a plot of phase angle (phase_V1), whereby the inverter is operated as in FIG. 16-a, FIG. 17-a are oscillograms of voltages, powers and currents when using the reactive current gradient at limited reactive power supply capability, FIG. 17-b are oscillograms of voltages, powers and currents when using the reactive current gradient at full reactive power supply capability, FIG. 17-c are oscillograms of voltages, powers and currents when using the real current gradient at limited reactive power supply capability, and FIG. 18 are oscillograms of voltages, powers, currents and the power error (after sign reversal) for proportional stabilizing control.

DETAILED DESCRIPTION

The present invention comprises two main aspects:
a) Stability analysis which runs in parallel to normal converter controls and which detects the operating status, i.e. whether the current operating point is stable or unstable and
b) an automatic stabilizing control augmenting normal converter power control while using a stability limit detection signal determined through preceding stability analysis Since the stability relevant voltage/power interrelationships for current sourced line-commutated and voltage sourced self-commutated converters are different both these devices are dealt with separately despite of common features and properties of the invention.

Line-Commutated Converter

Figures 1, 12:
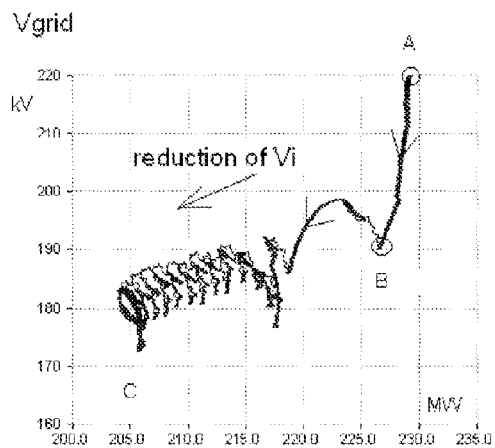

Starting with the line-commutated converter the core idea behind the present invention relates to the fact that at minimum firing angle, resp. extinction angle, a decrease of AC voltage causes a decrease of DC voltage and a corresponding decrease of DC power. The DC current controller compensates for the decrease of DC voltage and keeps the DC power constant. As long as the operating point lies on the upper branch of the voltage/power-characteristic of the AC network the operation remains stable (FIG. 1-f).

When the maximum transferable power (MTP) is reached, the operation becomes unstable since further increase of the DC current on the lower branch of the voltage/power-characteristic yields less real power. The AC voltage collapses within a time frame determined by the speed of the power controller. This collapse can be prevented through an automatic detection of the transfer from the stable branch to the unstable branch and an automatic control which brings the operating point back to the stable branch. Required are a stability analyzer and a stabilizing controller to reverse the DC current change from increase to decrease.

For stability analysis two network quantities are needed, whereby the second quantity is a function of the first quantity. The first quantity is the real power (P) flowing between the converter and the network. The second quantity is the corresponding real current (I). The derivatives of real current with respect to time (dI/dt) and real power with respect to time (dP/dt) are determined through measurements and filtering. As long as both these gradients have the same sign the operating point lies on the upper branch of the voltage/power-characteristic. If the signs are different the operating point lies on the lower branch of the characteristic. So the signs can be used to form a stability criterion.

Real power (P) and real current (I) can either be measured as DC quantities or as AC quantities. Relevant are in any case real power and real current at the weak AC connection point.

If the converters are terminals of a bidirectional DC link which connects either synchronous or asynchronous networks (N1, N2) (FIG. 2-a), then under normal AC voltage conditions as well as for a weak inverter grid (extinction angle at its minimum) the rectifier controls the DC current. If the rectifier grid is weak and the rectifier firing angle reaches its minimum value then DC current control is transferred to the inverter according to the usually applied marginal current control principle. In both the cases the access point for stabilizing control is the converter lying opposite to the weak grid. For closed loop stabilization measurement location and control location should preferably be the same. Therefore, measurements at that converter which controls the DC current are actually employed. Losses have to be taken into account accordingly.

The stabilizing measures depend partly on whether the converter connected to the weak AC Grid operates as rectifier or as inverter. The following treatment is, therefore, separated in two parts, wherein the first one deals with the rectifier mode and the second one with the inverter mode.

Rectifier stabilization can be achieved in two ways. The first one stabilizes the system around the MTP-point. The second one stabilizes the system through additional adaptive power order reduction. In the following the latter feature is called "MTP-dependent power order tracking". Accordingly there are two types of the Voltage Collapse Preventer, Type A (VCP-A) of FIG. 7 and type B (VCP-B) of FIG. 8. Both types of the VCP contain as fundamental elements a stability analyzer 1, a sign reverser 2 and a stabilizing controller 3.

The stability limit detection signal (slds) formed by the stability analyzer 1 provides information on whether the operating point lies on the upper or lower branch of the voltage/power characteristic. The signal is used as input to the sign reverser 2 to change the sign of the stabilizing controller 3. In this way the operating point it shifted back from the unstable branch to the stable branch. If the sign of the stabilizing controller 3 would now be kept the power would continuously decrease on the upper branch. Therefore, this process is stopped by bringing the sign back to its former value and the whole process repeats again. In this way the operating points shifts automatically around the MTP-point.

The pulse generator 22 provides clock signals (TS1 and TS2) of adjustable frequency, e.g. 1 kHz, and adjustable complementary pulse durations, e.g. 70% and 30%. Depending on the status of the stability limit detection signal (slds) either one of the clock signals (TS1 or TS2) is fed through the switch "US" (20) to the sign reversal switch "VZU" (21). The effect of the clock signals is twofold. They provide smooth control between sign reversals and in addition they provide sufficient rate of change of the quantities used for forming time gradients.

The stability limit detection signal (slds) is formed through threshold block 13. The input of threshold block 13 is a signal obtained through differentiating the first network quantity (P) and the second network quantity (I=f(P)) in the differentiators 11 and 10 and multiplication of their outputs via the multiplier 12. Filters in the differentiators 10 and 11 provide necessary smoothing.

The stability limit detection signal (slds) is also used for an annunciator 4 to alert the operator on the operation at the stability limit.

The stabilizing controller 3 contains the sign reversal switch "VZU" (21), the subtractor 31 to form the current control error, the divider "Div1" (30) to form the current set value Id* out of the power set value P*, and it contains controller 32 with a suitable algorithm.

Figure 8:
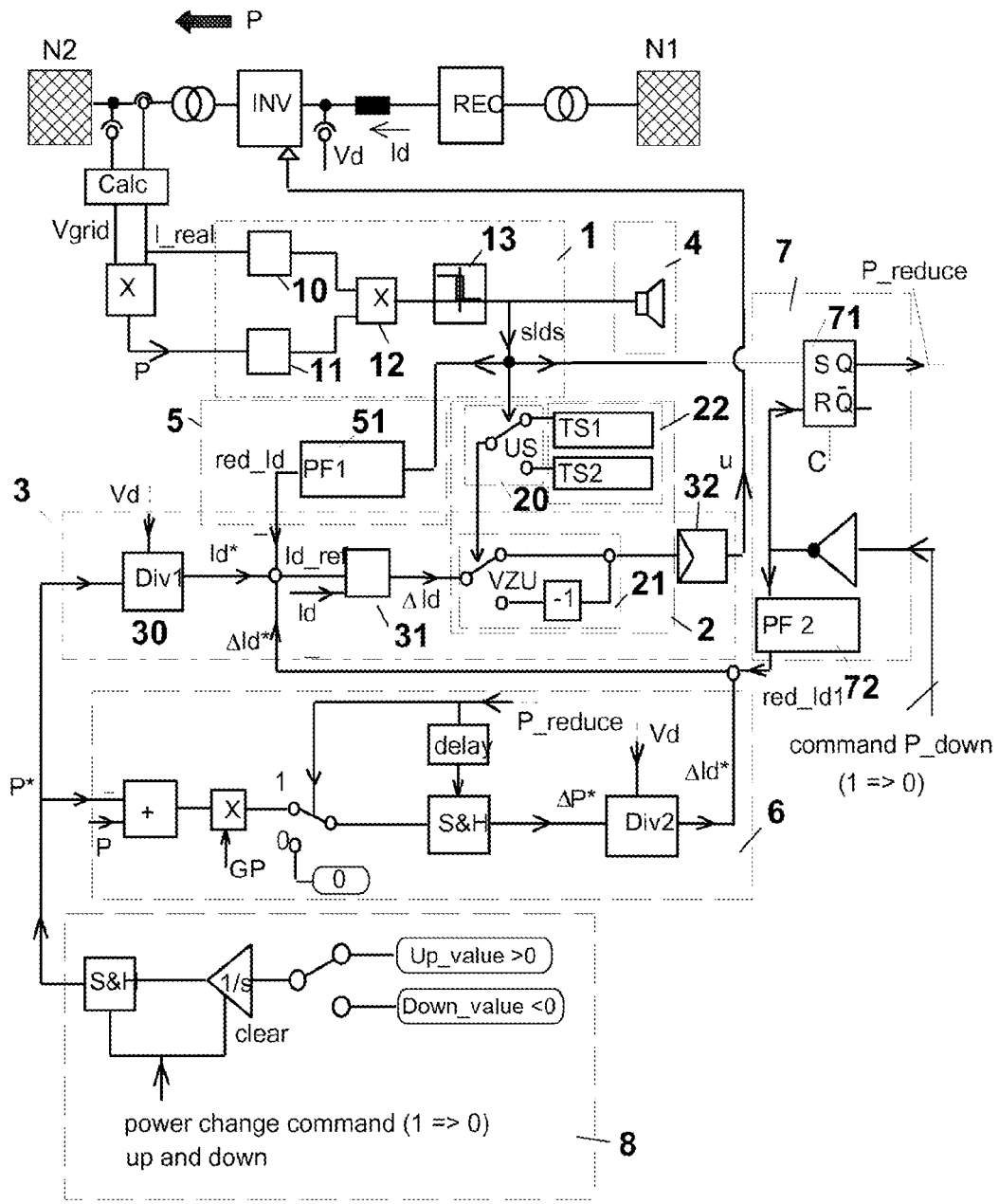
FIG. 8 is a block diagram for a DC transmission system with current sourced line-commutated converters and the rectifier working on a weak grid, including provisions for stability analysis and stabilizing control, whereby the current reference value (Id_ref) is automatically set in dependency of the maximum transferable network power.

To suppress the swings around the nose of the curve some elements are added resulting in the circuitry of FIG. 8. The direct current set value (Id*) formed in divider "DIV_1" (30) of the stabilizing controller 3 is reduced by a pulsed change of the current reference value (redid) which is generated through pulse former "PF1" (51). This shifts the operating point back to the upper branch of FIG. 1-*a*. To keep now the operating point on the upper branch, a change of the current set value (ΔId*) formed in the reference value changer 6 is simultaneously added to the current set value (Id*) providing for a certain distance from the MTP-point.

This produces the now lowered DC current reference value (Id_ref) which is compared with the actual DC current value (Id) in subtractor 31 producing the current control error ΔId (Id*-Id). Via the sign reversal reverser 2 the current control error (ΔId) is fed to controller 32 the output of which is the control signal "u" used to control the firing angle of the inverter (INV).

The reference value changer 6 works as follows: The power error (P-P*) occurring when the MTP-point is reached is multiplied by an adjustable factor "GP" and then kept constant through the sample&hold circuit (S&H) the output of which is then the calibrated change of the power set value (ΔP*). The hold signal (P_reduce) for the sample&hold circuit (S&H) is generated in the power reducer 7. The output of the divider "DIV_2" in 6 is the change of the current set value (ΔId*). The effect of the calibrated change of the current set value (ΔId*) is that the reference value of the DC current (Id_ref) is automatically changed in accordance with the maximum transferable power of the AC network. Hence, one obtains adaptive MTP-dependent power order tracking. Changes of the stability limit caused through structural network changes, load change or voltage change in response to AC faults are automatically taken into account for forming the reference value (Id_ref) of the DC current.

A manual adjustment of a lower power set value (P*) fed to divider "DIV1" (30) and activated through "power change command up and down" in the power change commander 8 and "command P_down" in the power reducer 7 is prepared through a negative current pulse "red_Id1" formed through pulse former "PF2" (72) in the power reducer 7. This preparation is necessary to prevent coincidental occurrence of a manual power reduction command when operating on the lower branch of the voltage/power-curve. This would cause further decrease of the power on the lower branch in connection with further current increase and voltage decline.

Digital computer simulations prove the viability of the above described method and the technical feasibility of the proposed circuits of FIGS. 7 and 8. FIGS. 11 and 12 demonstrate this for the current sourced line-commutated rectifier operating on a weak AC system. FIG. 7 and the corresponding FIG. 11 hold for operation without MTP-dependent power order tracking and FIG. 8 and the corresponding FIG. 12 hold for operation with MTP-dependent power order tracking. The current sourced line-commutated inverter (INV) operating on a weak AC system (N1) (FIG. 9) will be dealt with in a separate chapter due to its specific properties.

Main data of the rectifier are: rated DC power 200 MW, rated DC current 3.6 kA, nominal AC terminal voltage 230 kV, short circuit voltage of the converter transformer 12%, nominal firing angle (alpha) of the rectifier 15°, nominal reactive power supply of filter circuits and condenser bank 125 MVAR. The weak AC grid is represented by an equivalent circuit consisting of a source voltage (Vi) and a reactance.

The following simulation holds for a PID-controller (32): gain of the proportional part is 3 kA/kVdc, time constant and gain of the integral part are 0.03 s and 1 kA/kVdc, respectively, time constant and gain of the derivative part are 0.2 s and 2 kA/kV, respectively. DC voltage (Vd) is controlled via the rectifier (REC) and the DC current (Id) is controlled via the inverter (INV) for all network conditions. This assumption implies that at sinking rectifier AC voltage and minimum rectifier firing angle DC current control is transferred to the inverter according to the marginal current control method. In the simulation the under-load-tap-changer of the rectifier transformer is blocked which is a conservative assumption.

FIGS. 11-*a* and 11-*b* show curves of AC grid voltage "Vgrid" and transmission angle "delta_grid" versus real power "P" for a short circuit power ratio SCR=1.85. The power is ramped up starting with 155 MW. At 195 MW the MTP level is reached. The voltage at this power level is still above 220 kV, i.e. VDCOL would not be actuated. The stability limit detection signal "slds" switches from one to zero when the MTP level is reached (FIG. 11-*c*). This signal is used to change the sign of the stabilizing controller (3). With each change between logic zero and logic one and vice versa the operating point swings around the MTP-value of the voltage/power curve of the network (N1). The AC grid voltage moves between about 215 kV and 223 kV at the stability limit which are normal values.

FIG. 11-*d* shows the powers over time with the actual power "P" reaching the MTP level shortly before 30 s and the set value "P*" ramping somewhat further before being stopped. The stop can be achieved through the use of the stability limit detection signal (slds) itself or, as it is done here, through sensing a certain difference between the power set value (P*) and the actual power (P) while ramping up the set value. To implement this feature the "power change command up and down" in (8) is combined over an AND-gate with "P_reduce" of (7) (not shown in FIG. 8).

FIG. 11-*e* shows further the AC grid "Vgrid" and the transmission angle "delta_grid" over time. It can be clearly seen that the voltage is already on the way down shortly before 30 s. Without the VCP the voltage would definitely collapse. However, here the VCP stops the voltage decline and stabilizes the transmission at the MTP level, i.e., at maximum transferable power. If the voltage swings are not wanted or acceptable further means as described below are available to move the operating point automatically away from the MTP level. FIG. 11-f shows the effect of the VCP on DC quantities. The DC voltage is not depressed as it would be the case with VDCOL. The DC current does not go beyond its nominal value.

The MTP-point for a higher SCR value than 1.85 would be reached at a relatively low value of the AC grid voltage. Then other means as, e.g., voltage dependent current order limiting (VDCOL) could possibly provide protection against voltage collapse. If, however, VDCOL would be tuned to the higher SCR value and the SCR value would change to a lower value, e.g., through an AC line trip, instability and voltage collapse would occur if there is no back-up. The VCP detects the situation irrespective of the absolute voltage magnitude, and stabilizes the transmission. Thus the VCP provides also a back-up for a VDCOL function.

Operation at the stability limit can directly be indicated in the control room through annunciator 4 (FIGS. 7 and 8) by an audible or visible alarm (FIG. 11-7). Thus, the operating personnel will immediately be alerted on the special situation and they can manually activate a lower power level as shown further down.

The PID-controller (32) used for above simulations can be substituted by a purely proportional controller which can either be inserted before or after the sign reverser 2 (FIGS. 7 and 8). In any case an additional first order time delay has to be included after the sign reverser. The following demonstrates the viability of the solution when a proportional controller is arranged before the sign reverser 2. The gain of the P-controller is 20 and the time constant and the gain of the delay function are 1 s, resp. 1 kV/1 kA. The converter is connected to the AC grid via two parallel AC lines, the inductivities of which are 0.38 H and 0.8 H, respectively.

In FIG. 11-8 the starting value of the DC power set value (P*) is 180 MW. The power order ramps linearly from this value up to 250 MW. At a power of 227 MW the MTP-point is reached. This power level is automatically kept constant up to the time instant of 30 s where the parallel AC line with an inductivity of 0.8 H is manually switched off. This results in an automatic reduction of the DC power down to a new MTP-value which is now 195.5 MW. At the instant of 43 s the AC line is manually reclosed. The DC power increases automatically up to the previous MTP-value of 227 MW. From the instant of 57 s on the operator actuates manually a linear decrease of the power set value (P*) down to 214 MW. The actual power (P) decreases correspondingly. At an instant of 72 s the AC line is again switched off. The power (P) steps automatically down to the MTP-value of 195.5 MW and stays there.

At the instant of 87 s the operator tries to ramp the power up to 250 MW without drawing the proper conclusion from the difference between the power set value (P*) of 214 MW and the already lower power value of 195.5 MW (P). The consequence of this operator action is that the actual DC power decreases further, i.e. the operating point moves along the unstable branch of the operating curve. This lasts as long as the stability analyzer needs to detect that the operating point lies on the unstable branch. Then the stabilizing controller 3 brings the power back to the MTP-value of 195.5 MW and keeps it there.

FIGS. 12-1 to 12-6 hold when 5, 6 and 7 are added to FIG. 7 resulting in FIG. 8 providing MTP-dependent power order tracking. The controller 32 is now again the PID-controller from above. To examine the operational characteristics of this circuit the internal AC network voltage (Vi) is ramped down. The circuit provides stabilization at operating point "B" through automatic reduction of the DC current set value (Id*) (output of 30) by the current change value (ΔId*) (FIG. 12-5) in response to the occurrence of "P_reduce" (FIG. 12-6). This avoids swings around the MTP-point. The actual power (P) shown in FIG. 12-3 is the total AC side rectifier power. The power set value (P*) holds for the DC side of the rectifier. This explains the initial difference between the stationary values of the power set value (P*) and the actual power (P) around operating point "A" (FIGS. 12-3 and 12-4).

Further reduction of the internal AC grid voltage (Vi) starting at about an instant of 38 s generates swings around the MTP-point since there is no second stage power reduction implemented in the test circuit. Power reduction below the MTP-level could also be initiated by the operating personnel through manual reduction of the power set value (P*) and activation through "command power_down" (7) and "power change command" (8) (FIG. 8).

Figures 2, 12:
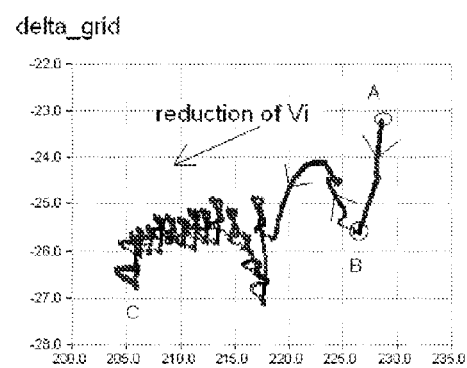
Figures 3, 12:
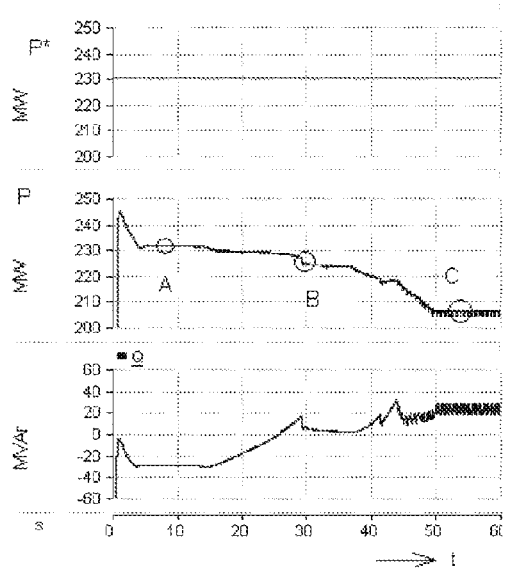
Figures 4, 12:
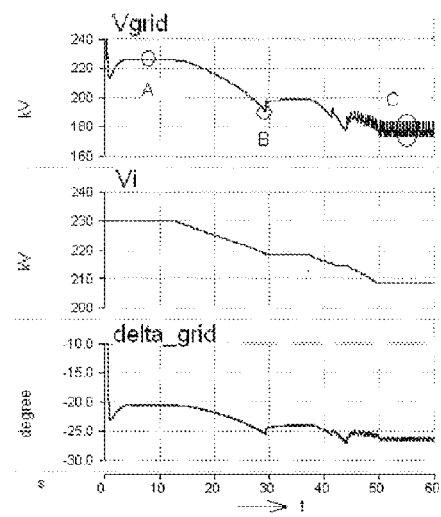

FIGS. 12-1 and 12-2 show the corresponding trajectories of the AC grid voltage (Vgrid) and the transmission angle (delta_grid) as a function of real power (P). The internal AC grid voltage (Vi) is continuously decreased. The maximum transferable power declines accordingly. Swings can be seen around the nose of the vertical curves which are shifted to the left according to the decreasing MTP-level. These curves together with the quantities shown in FIGS. 12-3 to 12-6 prove that over the entire range of the applied internal grid voltage reduction the system remains controllable and stable. FIG. 12-6 is of particular interest since it shows the generation of "P_reduce" and the repeatedly generated pulsed change of the current reference value (redid) in response to the inverted stability limit detection signal (slds). Here "P_reduce" is only generated once. As said above, staged power reduction signals could also be generated through some expansion of the power reducer 6, thereby avoiding cycling at the stability limit.

Inverter operation of a current sourced line-commutated converter on a weak AC grid is much less robust than rectifier operation. This is particularly true when the MTP-point is passed. This accelerates the increase of the DC current so that commutation failures can often not be prevented through normal current and extinction angle control. Then special stabilizing controls are needed. The following example demonstrates this necessity.

Figure 9:
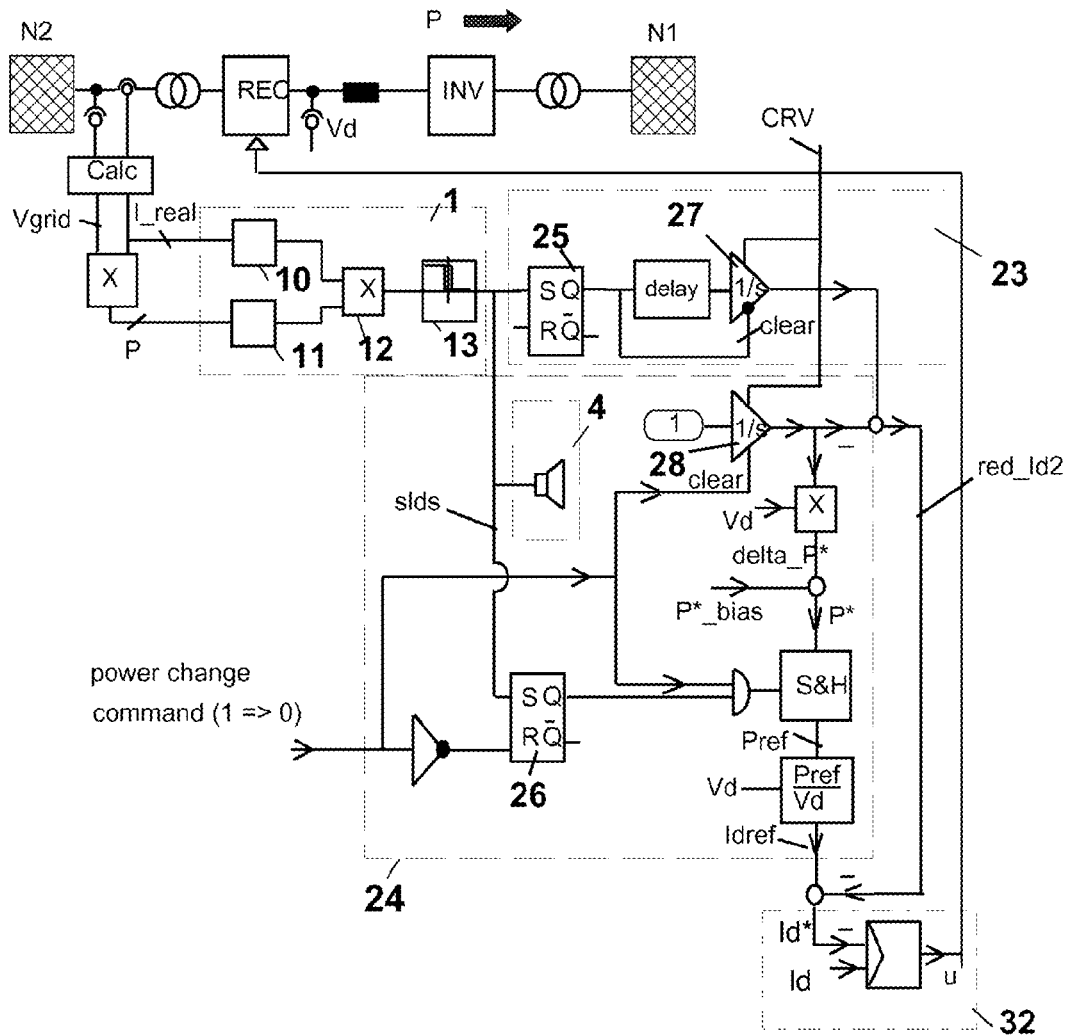
FIG. 9 is a block diagram for a DC transmission system with line-commutated converters and the inverter operating on a weak AC grid (N1) including provisions for built-in stability analysis and stabilizing control, FIG. 10-a-1 is a block diagram of a DC transmission system or a frequency converter using a voltage sourced self-commutated inverter including provisions for stability analysis and stabilizing control with operation at the stability limit, FIG. 10-a-2 is a block diagram of a DC transmission system or a frequency converter using a voltage sourced self-commutated inverter including provisions for stability analysis and stabilizing controls with a power reference value automatically set in dependency of the maximum transferable network power, FIG. 10-b is a block diagram for the generation of pulse width modulated switching signals using a phase-locked-loop circuit for synchronization, FIG. 10-c is a block diagram for the generation of pulse width modulated switching signals without a phase-locked-loop circuit using phase angle control on the basis of a frequency over power droop, FIG. 10-d is a block diagram for the generation of pulse width modulated switching signals without a phase-locked-loop circuit using phase angle control on the basis of a power over frequency droop, FIG. 10-e is a block diagram for the generation of pulse width modulated switching signals without a phase-locked-loop circuit using frequency control on the basis of a power over frequency droop, FIG. 10-f is a block diagram for the generation of pulse width modulated switching signals without a phase-locked-loop circuit using frequency control on the basis of a frequency over power droop, FIG. 11-a is a plot of the AC grid voltage (Vgrid) over real power (P) for stabilized operation of the line-commutated rectifier at the stability limit, FIG. 11-b is a plot of the transmission angle (delta_grid) over real power (P) for stabilized operation of the line-commutated rectifier at the stability limit, FIG. 11-c is an oscillogram of the stability limit detection signal (slds) for stabilized operation of the line-commutated rectifier at the stability limit, FIG. 11-d contains oscillograms of the power set value (P*) and the actual value (P) over time for stabilized operation of the line-commutated rectifier at the stability limit, FIG. 11-e contains oscillograms of the AC grid voltage (Vgrid), the internal grid voltage (Vi) and the transmission angle (delta_grid) over time for stabilized operation of the line-commutated rectifier at the stability limit, FIG. 11-f contains oscillograms of DC voltage (Vd), DC current (Id) and firing angle (alpha) for stabilized operation of the line-commutated rectifier at the stability limit.

Starting from a steady state operating point "A" (FIG. 13-a) the magnitude of the power set value (P*) is linearly increased. At "B" the MTP-point is reached and surpassed. At "C" commutation failures occur. To prevent commutation failures and to shift the operating point back to the stable operating branch the DC current has to be reduced immediately down to a value below the MTP-current level. The Voltage Collapse Preventer Type C (VCP-C) accomplishes this (FIG. 9). It comprises a stability analyzer 1, a current reduction value former 23, a power change command block 24, a PID-controller 32 and an annunciator 4. Also here simulations prove the viability of the method and the technical feasibility of this invention. Commutation failures and voltage instability are avoided. Starting from 200 MW the power set value (P*) (top trace of FIG. 13-f) is linearly increased via the power bias value (P*_bias) (24). The actual power (P) follows the set value (P*) along track "b" up to the MTP-limit (FIGS. 13-a and 13-f). The current surpasses the MTP-point (FIG. 13-d) since the current controller increases the DC current to compensate for the now arising and widening power deviation.

At operating point "c" (FIGS. 13-c and 13-d) the current increase is stopped and the current reference value (Idref) is decreased through a sudden application of a current reference value reduction (red_Id2) resulting in a new current set value (Id*) (FIG. 13-d). In response to this the power runs along track "d" down to operating point "e" (FIG. 13-c).

Current reference value reduction is pre-selectable in 23 through the input "CRV" and activated through the stability limit detection signal (slds) via Flop-Flop 25 (being initially in the reset status), a delay block and a fast integrator the limit of which is set via "CRV" (FIG. 9). The output of the integrator 27 is a quasi step function with the pre-selectable current reduction value "CRV" as amplitude.

Parallel to the reduced set value (Id*) at operating point "c" the power set value (P*) is frozen at the value of 217.5 MW ("c" in FIG. 13-c) through the sample&hold block "S&H" which is triggered over an and-gate via a SR-Flip-Flop 26. The Flip-Flop is set via the stability limit detection signal (slds).

At an instant of 25 s the power is manually reset to 200 MW and ramped up to a value of 210 MW which is below the MTP-level (FIG. 13-f). The "power change command" (manual input to 24) releases the sample&hold (S&H) from the hold status. Simultaneously at t=25 s the current reference value reduction (red_Id2) becomes zero because the outputs of both the integrators 27 and 28 are now identical. The operating point moves on track "f" from "e" to "g" (FIGS. 13-c and 13-d).

After having executed its stabilizing action the VCP is reinitialized via the "power change command" going from "0" to "1". This command clears both the integrators 27 and 28, the integrator 27 directly and the integrator 28 via Flip-Flop 26. The reset signal to Flip-Flop 25 is not shown in FIG. 9. Flip-Flop 26 was already reset through the previous power change command going from "1" to "0".

Method and means for closed loop stabilizing control with periodic sign switching through sign reverser 2 as shown in FIG. 7 are in general also valid for an inverter operating on a weak AC grid. And also the MTP-dependent power order tracking as implemented in FIG. 8 is applicable if both the stability analyzer 1 and the stabilizing controller 3 work fast enough so that commutation failures can be avoided. Whether this can be accomplished depends on actual main circuit parameters, controller speed and on the extinction angle margin chosen.

The following provides in a nonexclusive manner a summary on possible areas of application for the above described invention.

Both the AC grids (N1, N2) shown in FIG. 2-a can be partial grids of a synchronous super grid or of asynchronous grids. Frequently the power will come from huge water power plants in the range of several thousand MW. FIG. 2-b holds for the case where either a rectifier (REC) or an inverter (INV) operates on a weak grid (N1) and stabilizing control is executed as closed loop control using the stability analyzer 1, the sign reverser 2 and the stabilizing controller 3. The control output (u) of the stabilizing controller 3 is always fed to the converter (INV, REC) lying opposite to the weak grid (N1). FIG. 2-c holds for the case where an inverter (INV) operates on a weak AC grid (N1). When the MTP-level is surpassed immediate current order reduction (Id*) is actuated through the output (slds) of the stability analyzer 1. Stabilization is achieved without repetitive sign reversal by using the current order difference (ΔId*) in the stabilizing controller 3. The stability analyzer 1 uses real power (P) and real current (I) flowing to or from the weak AC grid (N1). However, these quantities are not directly measured in the weak AC grid (N1) but are preferably measured as AC or DC quantities at the opposite current controlling converter (REC).

Self-Commutated Converter

The stability problem of the self-commutated converter relates to the transmission angle of the network. Due to the voltage control capability of the self-commutated converter the stability problem does not show up in the magnitude of the voltage. Without taking any stabilizing measures the operating quantities change cyclically according to the study results obtained above. The diagrams 4-b and 6-b show that within the stable operating range up to shortly before 1.4 s the real power gradient (dP/dt) and the gradients of the reactive power (dQ/dt) and of all currents (dI/dt) possess equal positive signs. When surpassing the crest of the real power curve (FIGS. 4-b and 6-b) the real power gradient (dP/dt) becomes negative. The gradients of reactive power (Q), reactive current (I_reac) and apparent current (Iac) remain positive. The gradient of the real current (I) remains also positive for some time in FIG. 6-b—though the magnitude is relatively low.

Essential for forming the reactive power gradient is also the direction of reactive power flow. In above mentioned diagrams positive sign of reactive power means inductive reactive power flow to the AC grid.

Also when the operating point lies within the negative range of reactive power, i.e., the AC grid supplies reactive power, the sign of the reactive power gradient (dQ/dt) is determined, with its value being positive when the reactive power lies on the negative Q-axis and the change of the magnitude of the reactive power (Q), i.e. d|Q|/dt, is smaller than zero, i.e. signum (Q) times d|Q|/dt has to be formed. The gradients of the currents are formed from their magnitudes under consideration of their phase angles.

Through comparison of the gradients (dP/dt, d(f(P)/dt) a binary stability limit detection signal (slds) is formed. When the crest of the real power curve is passed this signal indicates transmission angle instability and impending de-synchronization of the system if no counteracting measures are taken. Such countermeasures as implemented through the circuit of FIG. 7 for the line-commutated converter can also be used for the self-commutated converter.

FIG. 10-a-1 contains a DC link with a self-commutated inverter operating on a weak AC grid (N1). Circuits of FIG. 7 and FIG. 10-a-1 are identical except for: the divider "Div_1" (30) of FIG. 7 is not needed in FIG. 10-a-1 and the inputs to 31 are now powers instead of currents.

For a verifying simulation following quantitative assumptions are made: real power is 3 MW and the AC grid voltage is 4 kV/60 Hz. The DC voltage is 10 kV and the size of the coupling inductor between converter and AC grid is 7 mH. A high pass filter circuit tuned to 950 Hz which is the carrier frequency of the converter supplies reactive power of 80 kVAr at nominal voltage. The filter keeps converter generated harmonic currents away from the AC grid. The internal AC grid voltage is kept constant at 4 kV. The internal grid reactance can be switched for test purpose between 3.140 hm and 6.280 hm.

The converter terminal voltage which is identical to the AC grid voltage is controlled through the inverter via a PID-controller with the following data: gain of the proportional part is 0.25 V/kV, gain and time constant of the integral part are 1 V/kV and 0.01 s, resp., and the gain and the time constant of the derivative part are 0.8 V/kV and 0.01 s, resp.

The quantities shown in FIG. 14-a and FIG. 14-b demonstrate that after changing the reactance from 3.14 Ohm to 6.280 hm shortly after 3 s the system remains stable. The AC voltage is controlled to its nominal value and the real power is decreased according to the MTP-level which is lower than the power reference value. Real power and reactive power are determined at the coupling point between the inverter and the AC grid ("Calc" in FIG. 10-a-1).

The rectifier (REC) of FIG. 10-*a*-1 can also be a line-commutated rectifier or some DC power source like, e.g., a battery storage plant, fuel cell or solar cell facility.

Pulse width modulation according to FIG. 10-*b* was used. A PLL-circuit synchronizes the internal inverter voltage via the control signal e(t) with the AC grid voltage (N1). The stabilizing function can be employed irrespective of the method used for pulse width modulation (PWM). Whether the classic carrier frequency method or some other kind of pulse width modulation is used is irrelevant for the generation of the stability limit detection signal "slds" and its use in the stabilizing controller 3. Also participation of the self-commutated converter in load-frequency controls is possible as shown in the a.m. paper on "Control and Stability of Voltage Sourced Converters Feeding Power to AC Grids", see pp. 459/460. The sign reverser has then to be placed into the load-frequency control loop.

The following simulations were performed with a PID-controller (32) (FIG. 10-*a*-1). At a stable operating point (P=3 MW) the grid short circuit power is reduced through opening switch S in FIG. 1-*b*. In the PQ-diagram of FIG. 1-*c* the operating point shifts immediately from "a" to "b". In FIGS. 14-*a* and 14-*b* the power (P) changes correspondingly from 3 MW down to about 1.75 MW. Power control brings the power back to about 2.5 MW which is the maximum transferable power level of the AC network.

The transmission angle (phase_V1) (FIG. 14-*c*) moves around 90° with the lowest value being 80° and the maximum value being 110°. With these angle excursions the lowest power value (P) can be calculated to be only 1.2% lower than the maximum transferable power level. This real power change around the MTP-level is of acceptable size considering the fact that the system does not collapse but that it is actually stabilized at the maximum possible power level. FIG. 14-*a* contains also essential signals of the stability analyzer 1, which are the output signals "diff_Q" and "diff_P" of the differentiators 10, resp. 11, the signal "crit" formed through sign comparison and fed to the threshold block 13 which generates the stability limit detections signal "slds". The signal "u" on the top trace is the angle $\delta^*$ of the converter control voltage e(t) (FIG. 10-*b*).

Operating at a power transmission angle (phase_V1) between 0° and 90° means that positive or negative real power change will cause a corresponding reactive power change with the same sign of change. That is, if both the first gradient (dP/dt) and the second gradient (dQ/dt) are positive, the operating point lies in the stable part of the grid PQ-diagram (Grid-PQ) (FIG. 1-*d*). Then there is no sign reversal through sign reverser 2 (FIG. 10-*a*-1).

When the transmission angle (phase_V1) surpasses the value of 90° the real power (P) decreases and the reactive power (Q) continuous to increase. Now the gradients (dP/dt, dQ/dt) differ with regard to their sign. The stability analyzer 1 (FIG. 10-*a*-1) provides the stability limit detection signal (slds) which is fed to the sign reverser 2 to change the sign of the stabilizing controller 3 (FIG. 10-*a*-1).

From FIG. 1-*d* the basic influence of the stabilizing measures on the reactive power flow (Q) of the AC grid and on the internal inverter voltage (Vq1) (which is proportional to the radius of the converter PQ-diagram) can be recognized. At fully inverter controlled AC terminal voltage (V1) the radius of the converter PQ-diagram (Converter-PQ) assumes values which correspond to the reactive power demand (Q) of the AC grid. This changes the radius of the converter PQ-diagram periodically. FIG. 14-*a* shows a pulsating reactive power demand (Q) of the AC grid. With respect to the apparent power "S=SQRT(P^2+Q^2)" the periodic increase of the reactive power is partly compensated through lower real power. This is reflected in the magnitude of the AC grid current (Iac) (bottom trace of FIG. 14-*a*) which is proportional to the apparent power and not proportional to the increased reactive power.

Even if the inverter reactive power (Q) is limited, e.g., through reaching the maximum modulation degree or through hitting the inverter's current limit, the angle stabilizing function remains operable. FIG. 15-*a* to 15-*c* demonstrate this for limited internal inverter voltage (Vq1). The AC terminal voltage (V1) cannot be controlled to its nominal value after the switch (S) (FIG. 1-*c*) is opened. The real power (P) changes between about 2.2 MW at maximum and 2.1 MW at minimum. The difference is about 5% of the minimum value. The power transmission angle (phase_V1) changes between about 50° and 90°, from which a real power change of 23%= (sin 90°−sin 50°=0.23) is determined. The difference between the actually measured power change of 5% and the calculated change of 23% can be explained as follows. At, e.g., an instant of 4 s the AC terminal voltage (V1) is at its maximum value but the transmission angle (phase_V1) reaches then its minimum value. At, e.g., an instant of 4.5 s the situation is just reverse: the voltage is at its minimum, the angle is at its maximum. Thus, voltage and angle changes compensate partly with respect to their influence on real power (P).

The shifts around the MTP-point can be avoided by reducing the power reference value below the MTP-level. Manual reduction can be initiated when an alerting signal is given, e.g., through the annunciator 4 in FIG. 10-*a*-1. Automatic power reduction can be achieved by counting the number of pulses of the stability limit detection signal (slds) (FIG. 14-*d*, 15-*d*) and a decrease of the power by a value of, e.g., 10% of the actually transferred power when a certain number of pulses (e.g. 5) is reached. Another possibility is to apply MTP-dependent power current order reduction, analogue to the line-commutated rectifier operating on a weak grid. FIG. 10-*a*-1 is then complemented through blocks 5, 6, 7 and 8 as already used in FIG. 8. This yields FIG. 10-*a*-2. The current signals of FIG. 8 (red_Id1, red_Id, Idref, Id*, Id, ΔId*) are in the given sequence exchanged with power signals (red_P1, red_P, Pref, P*, P, ΔP*).

Stability analysis and stabilizing control are also fully intact when not abrupt but slow destabilizing events occur. FIG. 16-*a* to FIG. 16-*d* prove this for a power reference value which is only by 0.01 MW higher than the maximum transferable power level of 2.1 MW. Because of this low difference the transmission system appears to be stable for some duration, here over 25 s between about 25 s and 50 s (FIG. 16-*a*). From the values of power (P) and voltage (Vgrid) the operator cannot determine that voltage collapse is impending. And there is no change of a system switching state which would automatically produce an alarm signal. Only automatic stabilizing control can cure the problem.

FIG. 16-*b* shows the gradients of real power (diff_P) and reactive power (diff_Q) and the signal "crit" from which via the threshold block 13 (FIG. 10-*a*-1) the stability limit detection signal (slds) is formed. FIG. 16-*c* shows that the operating point shifts around the crest of the power-angle curve and FIG. 16-*d* shows that despite of angle values lying above the steady state stability limit of 90° stability is not lost. Of course, also here, MTP-dependent power reduction as described above is possible in order to avoid the swings.

According to the before described study results reactive current (I_reac) or real current (I) instead of reactive power (Q) can be used to form the second gradient (df(P)/dt). FIGS. 17-*a* and 17-*b* hold when reactive current (I_reac) is used, whereby FIG. 17-*a* holds for limited voltage control capability and FIG. 17-*b* for unlimited voltage control capability. FIG. 17-*c* holds when real current (I) is used at limited voltage control capability. It has to be noted that real current (I) is not identical to DC current (Id).

Like the line-commutated converter also the self-commutated converter can be equipped with a P-controller (32) before or after the sign reverser 2. The gain of this controller is here 1 rad/MW. A low order filter after sign reverser 2 is necessary. The corner frequency of this filter was adjusted to 5 Hz. Also here the power (P) adapts itself to the maximum transferable power (FIG. 18) which for test purpose is changed trough stepwise increase (at t=2.3 s and t=4.2 s) and decrease (at t=7.3 s) of the internal grid reactance. The signal "delta_P_switched" is the real power error after sign reversal switch 21.

When a rectifier operates on a weak AC grid the stability limit detection signal (slds) is formed at the rectifier by using the gradients (dP/dt, dQ/dt) of the real power (P) and the reactive power (Q) (FIG. 2-*e*). Since current control is exerted via the inverter the locations for measurement and current control differ for long distance transmissions. I.e., data transmission would be required. Since, however, closed loop current control is time critical the stability limit detection signal (slds) is not used for sign reversal in the current control loop but is used for an immediate reduction of the current reference value (Id*) by the current reference value reduction (red_Id2) analogue to FIG. 9. Through an ensuing manual "power change command" (24) the power set value (P*) is then manually adapted to the actual power (P). Real-time simulations using physical communication devices would be necessary to clarify whether the data transmission rate is sufficiently high to permit closed loop stabilizing control with different locations for measurements and control actuation.

The relationship between real power (P) and reactive power demand (Q) of the AC grid as depicted in FIG. 1-*d* holds also for a line-commutated converter when a STATCOM controls the AC terminal voltage. At a trip of a parallel AC line as depicted in FIG. 1-*b* the maximum transferable power of the AC grid might become lower than the actual DC power set value with the consequence of transmission angle instability. Using the stability analyzer 1 of the self-commutated converter—with the second gradient being formed from the reactive current (I_reac) instead from the real current (I)—will permit stabilization.

The following summarizes in a nonexclusive manner areas of application for the present invention relating to the self-commutated converter.

The arrangements of FIG. 2-*d* and FIG. 2-*e* are mainly used for the connection of asynchronous networks, for long distance transmission, but also for power exchange between synchronous network sections if the short circuit power shall not be increased. The stabilizing controller 3 is located at the inverter, irrespective of whether the rectifier (REC) or the inverter (INV) operates on a weak AC grid. FIG. 2-*d* holds for an inverter operating on a weak grid (N1). The relevant grid quantities (P, Q) which are used for in the stability analyzer 1 are located at the same transmission end as the stabilizing controller 3. Therefore closed loop stabilization at the MTP-point is possible. In FIG. 2-*e* the inverter lies opposite to the weak grid (N1). Therefore, no closed loop stabilizing control at the MTP-point is applied here but current or power reduction is actuated by the stability limit detection signal (slds).

A frequent application is the connection of a synchronous generator driven by a wind turbine via a frequency converter (FIG. 2-*f*). Then, real power and reactive power are measured at the inverter. This permits stabilizing closed loop control at the maximum transferable power level. Connection of a double fed asynchronous generator driven by a wind turbine is made via a configuration similar to that shown in FIG. 2-*d*. When directly coupling a DC source via a converter to the AC grid (FIG. 2-*g*) the converter operates as rectifier when energy is stored or it operates as inverter when energy is delivered. In both the cases closed loop stabilizing control is possible at the maximum transferable power level.

The present invention comprises furthermore a method and an apparatus to realize automatic control for prevention of voltage instability of High Voltage Direct Current Transmission Systems and Frequency Converters using current sourced line-commutated converters or voltage sourced self-commutated converters.

Yet further: Automatic recognition of the transfer between the upper and lower branch of the voltage/power characteristic of the network through forming gradient values and evaluating them via a threshold block with hysteresis.

Yet further: Automatic change of the sign of the feedback loop of the current controller when running through the maximum transferrable power point.

Yet further: Higher frequency sign reversal providing operation at the stability limit with the maximum possible power.

Yet further: Announciation that the maximum transferrable power point is reached.

Yet further: Pulse-wise shifting of the operating point from the bottom branch to the upper branch of the voltage/power characteristic of the network with a simultaneous reduction of the current reference value.

Yet further: Actuation of a power reference change with a parallel negative current pulse.

Yet further: Current reference value reduction when detecting the stability limit.

Yet further: Reference value reduction with an automatic compensation of a former current value reduction and taking over the actual power value or some value below the maximum transferrable power point as new power reference value.

The underlying system, such as a computer or a computer network with connected memory device, may comprise an interface in order to also accept and process queries from the Internet for similar documents with regard to a citation document.

The block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium is tangible, and it can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described to best explain the principles of the invention, the practical application, and to enable others of ordinary skill in the art to understand the invention for various embodiments with various modifications as are suited to the particular use contemplated.

The invention claimed is:

1. Method for automatic stabilization of an electric power supply network system comprising a network and at least one converter adapted to exchange maximum transferrable power with the network at steady state stability limit of the electric power supply network system by change of real current flowing between the network and a converter through a stabilizing controller, whereby the necessary direction of current change is determined through real-time stability analysis comprising the following steps:
   determining at least two electrical main circuit quantities,
   forming derivatives of the at least two main circuit quantities with respect to time,
   comparing the signs of the derivatives, and
   generating a steady state stability limit detection signal in dependency on the outcome of the comparing step,
   wherein the change of the current direction is achieved by reversing a control loop feedback sign of the stabilizing controller via application of the generated stability limit detection signal, and
   wherein the stability limit detection signal is generated by comparing the signs of gradient values of real power with respect to time with the signs of gradient values of a second real power dependent quantity with respect to time and if the signs are different the stability limit detection signals is set to a true value and if the signs are equal the stability detection signal is set to false.

2. The method of claim 1, wherein with each change of the value of the stability limit detection signal the feedback sign of the stabilizing controller is reversed.

3. The method of claim 2, wherein a sign reverser comprising two switches changes the feedback sign, whereby the first switch is operated by the stability limit detection signal and depending on the position of this switch either a first or a second clock signal operates the second switch, whereby the frequency and the pulse durations of the clock signals are adjustable.

4. A method for automatic stabilization of an electric power supply network system comprising a network and at least one converter adapted to exchange maximum transferrable power with the network at steady state stability limit of the electric power supply network system by change of real current flowing between the network and a converter through a stabilizing controller, whereby the necessary direction of current change is determined through real-time stability analysis comprising the following steps:
   determining at least two electrical main circuit quantities,
   forming derivatives of the at least two main circuit quantities with respect to time,
   comparing the signs of the derivatives, and
   generating a steady state stability limit detection signal in dependency on the outcome of the comparing step,
   wherein the change of the current direction is achieved by reversing a control loop feedback sign of the stabilizing controller via application of the generated stability limit detection signal,
   wherein the stability analysis detects whether the network system is currently in a stable or unstable state and it provides a stability limit detection signal identifying the stability state, and
   wherein the network power is adapted to maximum transferrable network power minus an adjustable power margin by adding negative changes to the DC current set value resulting in a DC current reference value, whereby the changes comprise a pulsed change and a constant change with the pulsed change being generated via a pulse former and the constant change being obtained by dividing the calibrated power error through direct voltage, whereby the calibrated power error is obtained through sampling and holding the product of power error and calibration factor, whereby sampling is started via a power reduction signal and hold is accomplished by the delayed power reduction signal.

5. The method of claim 3, wherein a manual negative change of real power by a pre-selectable magnitude is activated through a power change command and accompanied by a negative current pulse formed in a second pulse former.

6. The method of claim 3, wherein an audible or visible alarm is actuated by the stability limit detection signal.

7. The method of claim 1, wherein the current set value is reduced by a current reference value reduction value if the stability limit detection signal occurs and the current set value is then kept through an ensuing manual power change command offsetting the current reduction while at the same time the current reference value is reduced.

8. Apparatus for automatic stabilization of an electric power supply network system comprising a network and at least one converter and, further, a real-time stability analyzer and a stabilizing controller adapted to exchange maximum transferrable power with the network at steady state stability limit of the electric power supply network system by change of the real current flowing between the network and a converter through stabilizing controller, whereby the necessary direction of current change is determined through the stability analyzer which is configured to perform the determination of at least two electrical main circuit quantities, forming derivatives of the at least two main circuit quantities with respect to time, comparing the signs of the derivatives, and generating a steady state stability limit detection signal in dependency on the outcome of the comparing step, wherein the change of the current direction is achieved by reversing the control loop feedback sign of the stabilizing controller via application of the stability limit detection signal, and wherein the stability limit detection signal is generated by comparing the signs of gradient values of real power with respect to time with the signs of gradient values of a second real power dependent quantity with respect to time and if the signs are different the stability limit detection signal is set to a true value and if the signs are equal the stability detection signal is set to false.

9. The apparatus of claim 8, wherein with each change of the value of the stability limit detection signal the feedback sign of the stabilizing controller is reversed.

10. The apparatus of claim 9, wherein a sign reverser comprising two switches changes the feedback sign, whereby the first switch is operated by the stability limit detection signal and depending on the position of this switch either a first or a second clock signal operates the second switch, whereby the frequency and the pulse durations of the clock signals are adjustable.

11. A apparatus for automatic stabilization of an electric power supply network system comprising a network and at least one converter and, a real-time stability analyzer and a stabilizing controller adapted to exchange maximum transferrable power with the network at steady state stability limit of the electric power supply network system by change of the real current flowing between the network and a converter through stabilizing controller, whereby the necessary direction of current change is determined through the stability analyzer which is configured to perform the determination of at least two electrical main circuit quantities, forming derivatives of the at least two main circuit quantities with respect to time, comparing the signs of the derivatives, and generating a steady state stability limit detection signal in dependency on the outcome of the comparing step, wherein the change of the current direction is achieved by reversing the control loop feedback sign of the stabilizing controller via application of the stability limit detection signal, wherein the stability analyzer detects whether the network system is currently in a stable or unstable state and it issues a stability limit detection signal identifying the stability state, and wherein the network power is adapted to maximum transferrable network power minus an adjustable power margin by adding negative changes to the DC current set value resulting in a DC current reference value, whereby the changes comprise a pulsed change and a constant change with the pulsed change being generated via a pulse former and the constant change being obtained by dividing the calibrated power error through direct voltage, whereby the calibrated power error is obtained through sampling and holding the product of power error and calibration factor, whereby sampling is started via a power reduction signal and hold is accomplished by the delayed power reduction signal.

12. The apparatus of claim 10, wherein a manual negative change of real power by a pre-selectable magnitude is activated through a power change command and accompanied by a negative current pulse formed in a second pulse former.

13. The apparatus of claim 10, wherein an audible or visible alarm is actuated by the stability limit detection signal.

14. The apparatus of claim 8, wherein the current set value is reduced by a current reference value reduction value if the stability limit detection signal occurs and the current set value is then kept through an ensuing manual power change command offsetting the current reduction while at the same time the current reference value is reduced.

\* \* \* \* \*